United States Patent
Suganuma et al.

(10) Patent No.: US 9,647,406 B2
(45) Date of Patent: May 9, 2017

(54) LASER UNIT AND EXTREME ULTRAVIOLET LIGHT GENERATING SYSTEM

(71) Applicant: GIGAPHOTON INC., Tochigi (JP)

(72) Inventors: Takashi Suganuma, Tochigi (JP); Takayuki Yabu, Tochigi (JP); Osamu Wakabayashi, Tochigi (JP); Seiji Nogiwa, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 15/172,757

(22) Filed: Jun. 3, 2016

(65) Prior Publication Data
US 2016/0285222 A1 Sep. 29, 2016

Related U.S. Application Data

(63) Continuation of application No. PCT/JP2015/051032, filed on Jan. 16, 2015.

(30) Foreign Application Priority Data

Jan. 27, 2014 (WO) .................. PCT/JP2014/051675

(51) Int. Cl.
*H01S 3/00* (2006.01)
*H01S 3/23* (2006.01)
(Continued)

(52) U.S. Cl.
CPC ............ *H01S 3/005* (2013.01); *H01S 3/2232* (2013.01); *H01S 3/2316* (2013.01);
(Continued)

(58) Field of Classification Search
CPC .......... H05G 2/00; H05G 2/001; H05G 2/003; H05G 2/005; H05G 2/006; H05G 2/008;
(Continued)

(56) References Cited

U.S. PATENT DOCUMENTS

| 6,791,094 B1* | 9/2004 | Olson | ................... H01J 37/304 250/396 ML |
| 2010/0078577 A1* | 4/2010 | Moriya | .................. H05G 2/005 250/504 R |

(Continued)

FOREIGN PATENT DOCUMENTS

| JP | 2010-118518 A | 5/2010 |
| JP | 2010-186735 A | 8/2010 |

(Continued)

OTHER PUBLICATIONS

International Search Report of PCT/JP2015/051032 mailed Mar. 31, 2015.

*Primary Examiner* — David E Smith
(74) *Attorney, Agent, or Firm* — Studebaker & Brackett PC

(57) ABSTRACT

There is provided a laser unit that may include a master oscillator, a laser amplifier, and an adjuster. The master oscillator may be configured to output a laser light beam. The laser amplifier may be disposed in a light path of the laser light beam outputted from the master oscillator. The adjuster may be disposed in the light path of the laser light beam, and may be configured to adjust a beam cross-sectional shape of the laser light beam amplified by the laser amplifier to be a substantially circular shape. The beam cross-sectional shape may be at a beam waist of the laser light beam or in the vicinity of the beam waist of the laser light beam, and may be in a plane orthogonal to a light path axis.

18 Claims, 29 Drawing Sheets

(51) Int. Cl.
    *H05G 2/00* (2006.01)
    *H01S 3/223* (2006.01)
(52) U.S. Cl.
    CPC ........... *H01S 3/2366* (2013.01); *H05G 2/005* (2013.01); *H05G 2/008* (2013.01)
(58) Field of Classification Search
    CPC ...... H01S 3/005; H01S 3/2232; H01S 3/2316; H01S 3/2366; G03F 7/70025; G03F 7/70033; G03F 7/70925
    See application file for complete search history.

(56) References Cited

U.S. PATENT DOCUMENTS

| | | |
|---|---|---|
| 2012/0147349 A1 | 6/2012 | Van Dijsseldonk et al. |
| 2013/0020499 A1 | 1/2013 | Kameda et al. |
| 2013/0034116 A1 | 2/2013 | Nowak et al. |
| 2013/0148677 A1 | 6/2013 | Moriya et al. |
| 2013/0230064 A1 | 9/2013 | Tanaka et al. |
| 2015/0298211 A1* | 10/2015 | Abe .................. B29C 67/0077 419/28 |

FOREIGN PATENT DOCUMENTS

| | | | |
|---|---|---|---|
| JP | 2012-069907 A | 4/2012 | |
| JP | WO 2012066402 A1 * | 5/2012 | ............. H01S 3/005 |
| JP | 2012-109417 A | 6/2012 | |
| JP | 2013-502059 A | 1/2013 | |
| JP | 2013-179247 A | 9/2013 | |

* cited by examiner

LASER UNIT AND EXTREME ULTRAVIOLET LIGHT GENERATING SYSTEM

CROSS REFERENCE TO RELATED APPLICATIONS

This is a continuation of International Application No. PCT/JP2015/051032, filed Jan. 16, 2015, which claims the benefit of International Application No. PCT/JP2014/051675, filed Jan. 27, 2014, the entire contents of both of which are incorporated herein by reference.

BACKGROUND

The disclosure relates to a laser unit and an extreme ultraviolet light generating system to generate extreme ultraviolet (EUV) light, based on pulsed laser light outputted from the laser unit.

In recent years, miniaturization of a transcription pattern of an optical lithography in a semiconductor process is drastically progressing with the development in fining of the semiconductor process. In the next generation, microfabrication on the order of 70 nm to 45 nm, and further microfabrication on the order of 32 nm or less are bound to be required. To meet such requirement for the microfabrication on the order of, for example, 32 nm or less, development is anticipated of an exposure apparatus that includes a combination of a reduced projection reflective optics and an extreme ultraviolet light generating apparatus that generates extreme ultraviolet (EUV) light with a wavelength of about 13 nm. For example, reference is made to Japanese Unexamined Patent Application Publication (Published Japanese Translation of PCT Application) No. JP2013-502059, and U.S. Patent Application Publication No. 2012/0147349.

As the EUV light generating apparatus, three kinds of apparatuses, laser produced plasma (LPP) apparatus using plasma generated by irradiation of a target substance with laser light, a discharge produced plasma (DPP) apparatus using plasma generated by electric discharge, and a synchrotron radiation (SR) apparatus using orbital radiation light have been proposed.

SUMMARY

A laser unit according to an embodiment of the disclosure may include a master oscillator, a laser amplifier, and an adjuster. The master oscillator may be configured to output a laser light beam. The master oscillator may be configured to output a laser light beam. The laser amplifier may be disposed in a light path of the laser light beam outputted from the master oscillator. The adjuster may be disposed in the light path of the laser light beam, and may be configured to adjust a beam cross-sectional shape of the laser light beam amplified by the laser amplifier to be a substantially circular shape. The beam cross-sectional shape may be at a beam waist of the laser light beam or in the vicinity of the beam waist of the laser light beam, and may be in a plane orthogonal to a light path axis.

An extreme ultraviolet light generating system according to an embodiment of the disclosure may include a chamber, a target feeder, a master oscillator, a laser amplifier, a laser concentrating optical system, and an adjuster. In the chamber, a pulsed laser light beam may be to be applied to a target to generate extreme ultraviolet light. The target feeder may be configured to supply the target into the chamber. The master oscillator may be configured to output a laser light beam serving as a seed of the pulsed laser light beam. The laser amplifier may be disposed in a light path of the laser light beam outputted from the master oscillator. The laser concentrating optical system may be configured to concentrate the laser light beam amplified by the laser amplifier into the chamber. The adjuster may be disposed in the light path of the laser light beam between the master oscillator and the laser concentrating optical system, and may be configured to adjust a beam cross-sectional shape of the laser light beam concentrated by the laser concentrating optical system to be a substantially circular shape. The beam cross-sectional shape may be at a beam waist of the laser light beam or in the vicinity of the beam waist of the laser light beam, and may be in a plane orthogonal to a light path axis.

BRIEF DESCRIPTION OF THE DRAWINGS

Some example embodiments of the disclosure are described below as mere examples with reference to the accompanying drawings.

DETAILED DESCRIPTION

Figure 23:
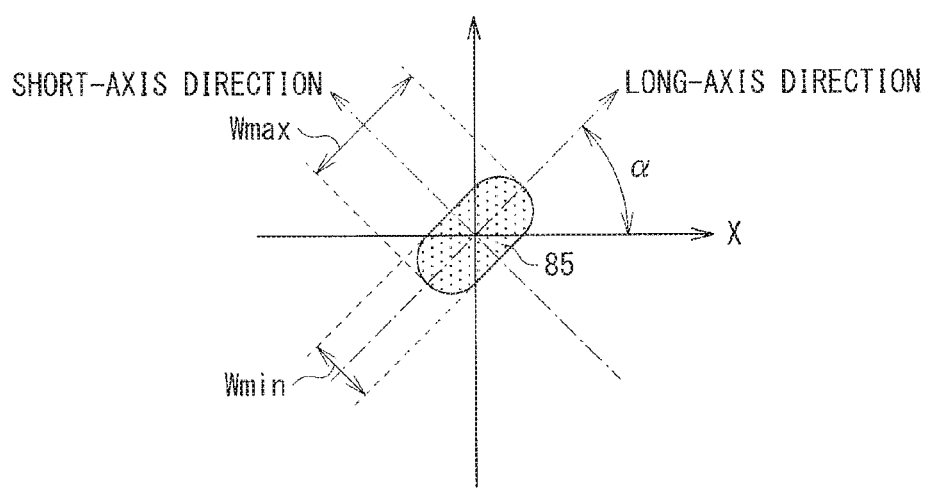
FIG. 23 schematically illustrates an example of a beam profile image to be measured in the laser unit illustrated in FIG. 20.
Figure 24:
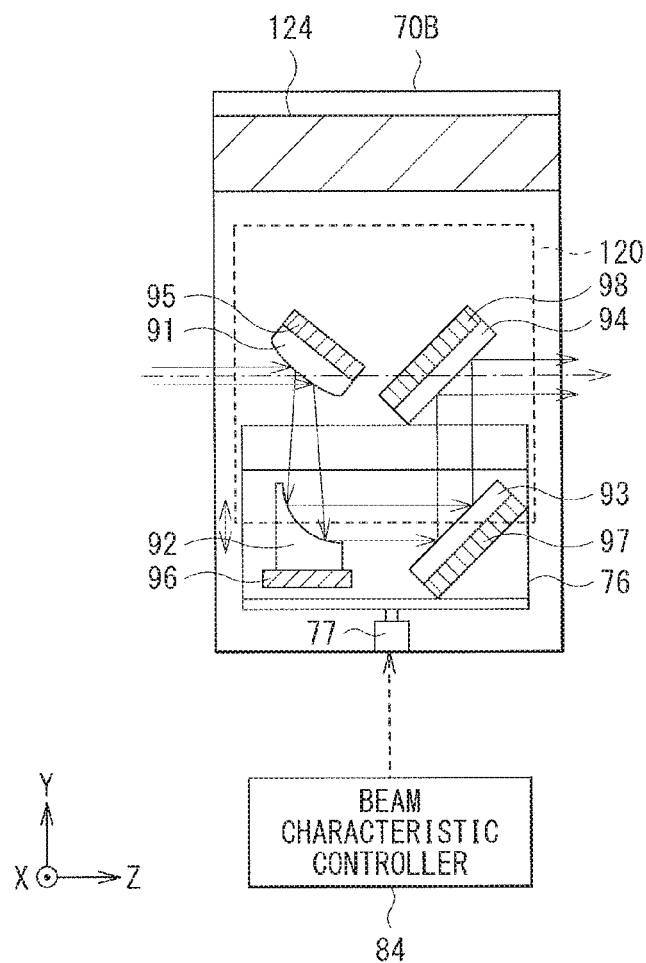
FIG. 24 schematically illustrates an example of a rotary mechanism that rotates a wavefront adjuster that uses a cylindrical mirror, as viewed in the X direction.
Figure 25:
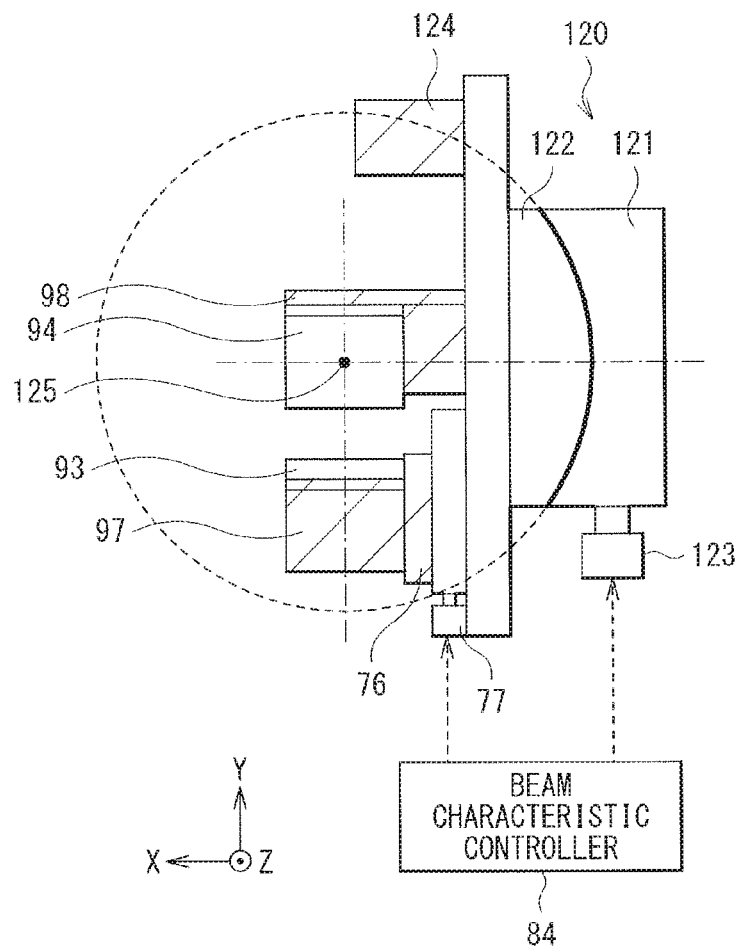
FIG. 25 schematically illustrates an example of the rotary mechanism that rotates the wavefront adjuster that uses the cylindrical mirror, as viewed in a Z direction.

[Contents]
[1. Outline]
[2. General Description of EUV Light Generating System] (FIG. 1)
  2.1 Configuration
  2.2 Operation
[3. Laser Unit Including Master Oscillator and Laser Amplifier] (FIG. 2 and FIG. 3)
  3.1 Configuration
  3.2 Operation
  3.3 Issues
4. First Embodiment (Laser unit including a wavefront adjuster) (FIG. 4 and FIG. 5)
  4.1 Configuration
  4.2 Operation
  4.3 Workings
  4.4 Modification Example
5. Second Embodiment (Laser unit including a beam characteristic measuring device) (FIG. 6)
  5.1 Configuration
  5.2 Operation
  5.3 Workings
  5.4 Modification Example
6. Third Embodiment (Laser unit including a slab amplifier) (FIG. 7 and FIG. 8)
  6.1 Configuration
  6.2 Operation
  6.3 Workings
  6.4 Modification Example
7. Fourth Embodiment (Variations of the wavefront adjuster)
  7.1 First Configuration Example (Example including a combination of a plurality of cylindrical lenses) (FIG. 9 and FIG. 10)
    7.1.1 Configuration
    7.1.2 Operation and Workings
    7.1.3 Modification Example
  7.2 Second Configuration Example (First example including a combination of a plurality of cylindrical mirrors) (FIG. 11)
    7.2.1 Configuration
    7.2.2 Operation and Workings
    7.2.3 Modification Example
  7.3 Third Configuration Example (Second example including a combination of a plurality of cylindrical mirrors) (FIG. 12)
    7.3.1 Configuration
    7.3.2 Operation and Workings
8. Fifth Embodiment (Variations of the beam characteristic measuring device)
  8.1 First Configuration Example (Example in which a beam profile is measured by one image sensor) (FIG. 13 and FIG. 14)
    8.1.1 Configuration
    8.1.2 Operation
    8.1.3 Workings
  8.2 Second Configuration Example (Example in which a beam profile is measured by two image sensors) (FIG. 15 and FIG. 16)
    8.2.1 Configuration
    8.2.2 Operation
    8.2.3 Workings
  8.3 Third Configuration Example (Example in which a beam profile is measured with use of a wavefront sensor) (FIG. 17)
    8.3.1 Configuration
    8.3.2 Operation and Workings
9. Sixth Embodiment (EUV light generating system including a pre-pulsed laser unit) (FIG. 18 and FIG. 19)
  9.1 Configuration
  9.2 Operation
  9.3 Workings
  9.4 Modification Example
10. Seventh Embodiment (Laser unit including a rotary mechanism of a wavefront adjuster) (FIGS. 20 to 23)
  10.1 Configuration
  10.2 Operation
  10.3 Workings
  10.4 Modification Examples
    10.4.1 First Modification Example (Laser unit including a rotary mechanism that rotates a cylindrical mirror) (FIG. 24 and FIG. 25)

10.4.2 Second Modification Example (Wavefront adjuster including a toroidal lens and cylindrical lenses) (FIGS. 26 to 29)

[11. Variations of Laser Amplifier]

Figure 30:
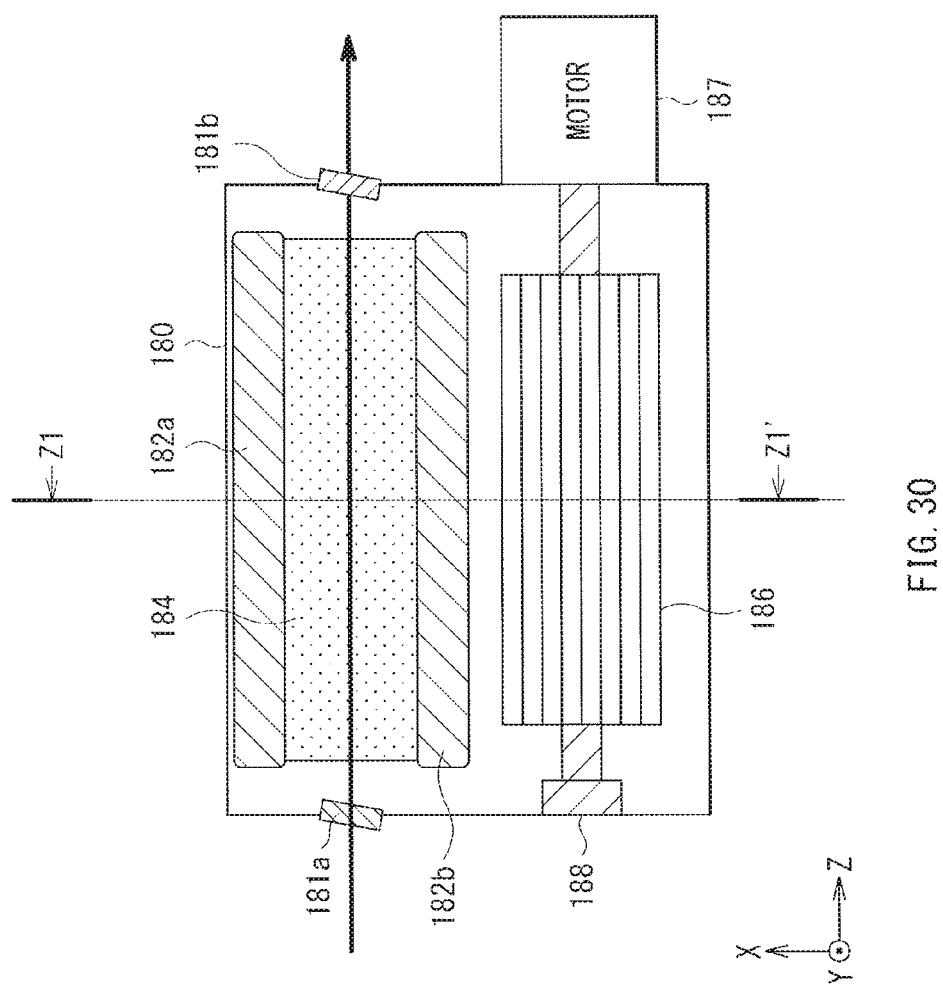
FIG. 30 schematically illustrates a configuration example of a triaxial orthogonal amplifier.
Figure 31:
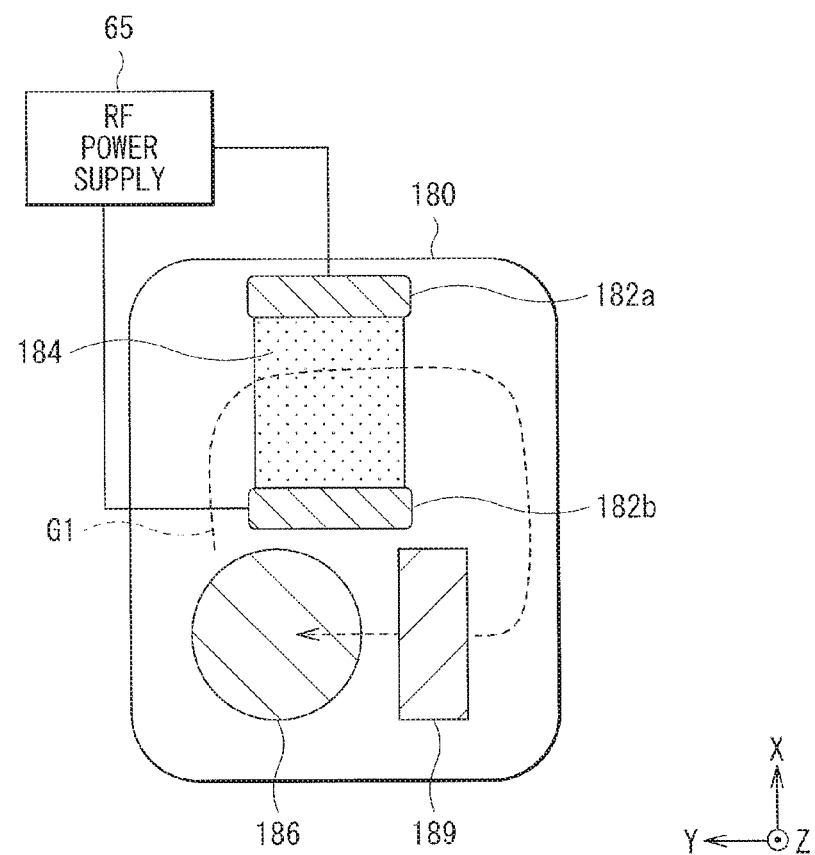
FIG. 31 schematically illustrates a configuration example, taken along a line Z1-Z1' of FIG. 30, of the triaxial orthogonal amplifier illustrated in FIG. 30.

11.1 Triaxial Orthogonal Amplifier (FIG. 30 and FIG. 31)

Figure 32:
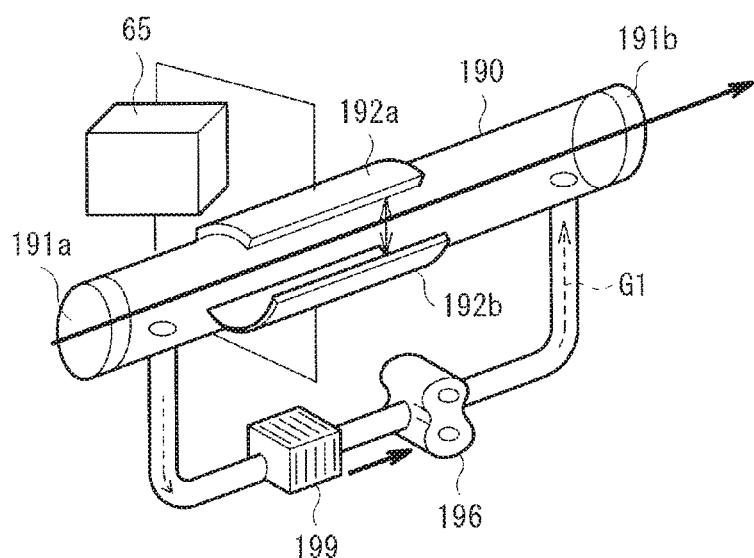
FIG. 32 schematically illustrates a configuration example of a fast-axial flow laser amplifier.

11.2 Fast-axial Flow Laser Amplifier (FIG. 32)

Figure 33:
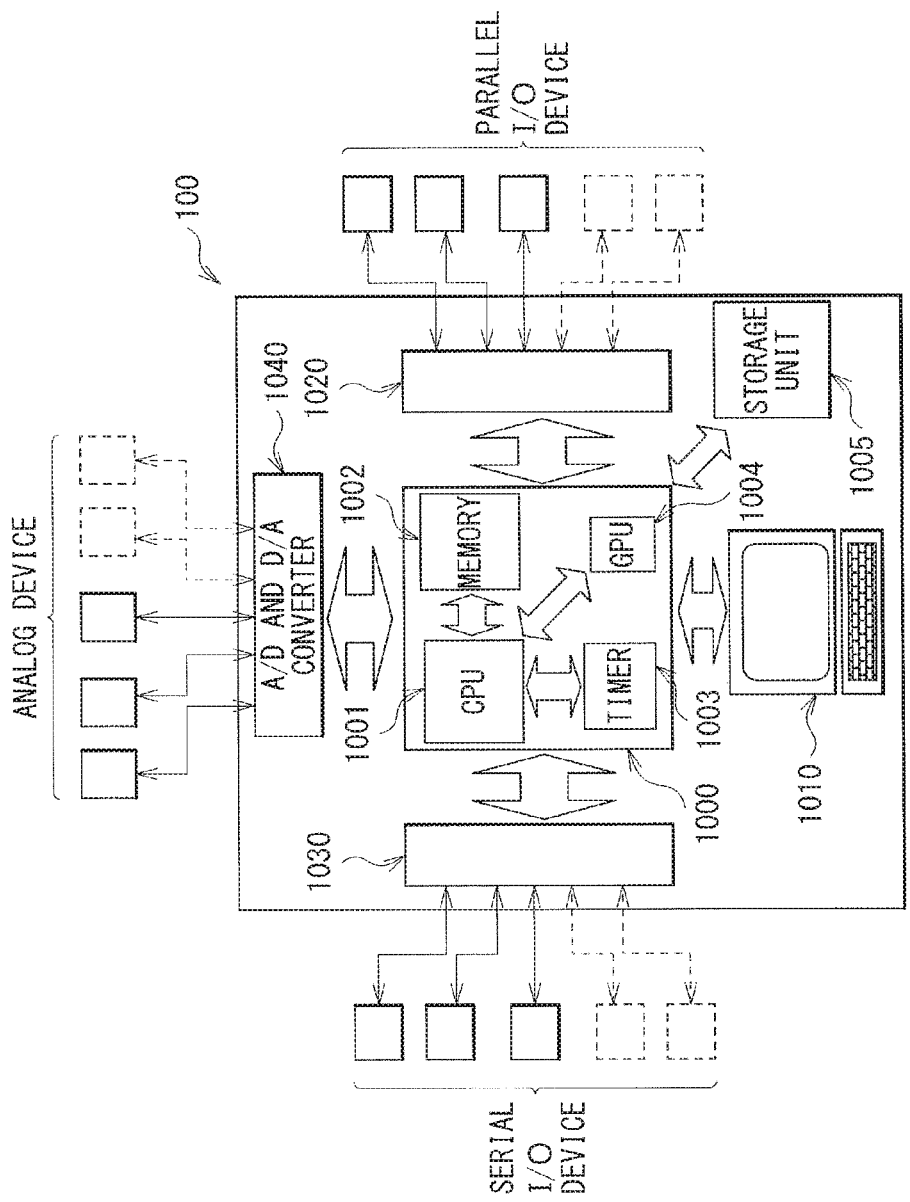
FIG. 33 illustrates an example of a hardware environment of a controller.

[12. Hardware Environment of Controller] (FIG. 33)

[13. Et Cetera]

In the following, some example embodiments of the disclosure are described in detail with reference to the drawings. Example embodiments described below each illustrate one example of the disclosure and are not intended to limit the contents of the disclosure. Further, all of the configurations and operations described in each example embodiment are not necessarily essential for the configurations and operations of the disclosure. Note that the like elements are denoted with the same reference numerals, and any redundant description thereof is omitted.

1. Outline

The disclosure relates to a laser unit used for an extreme ultraviolet (EUV) light generating apparatus that generates EUV light by irradiation of a target with laser light. Moreover, the disclosure relates to an EUV light generating system that uses such a laser unit.

2. General Description of EUV Light Generating System

2.1 Configuration

Figure 1:
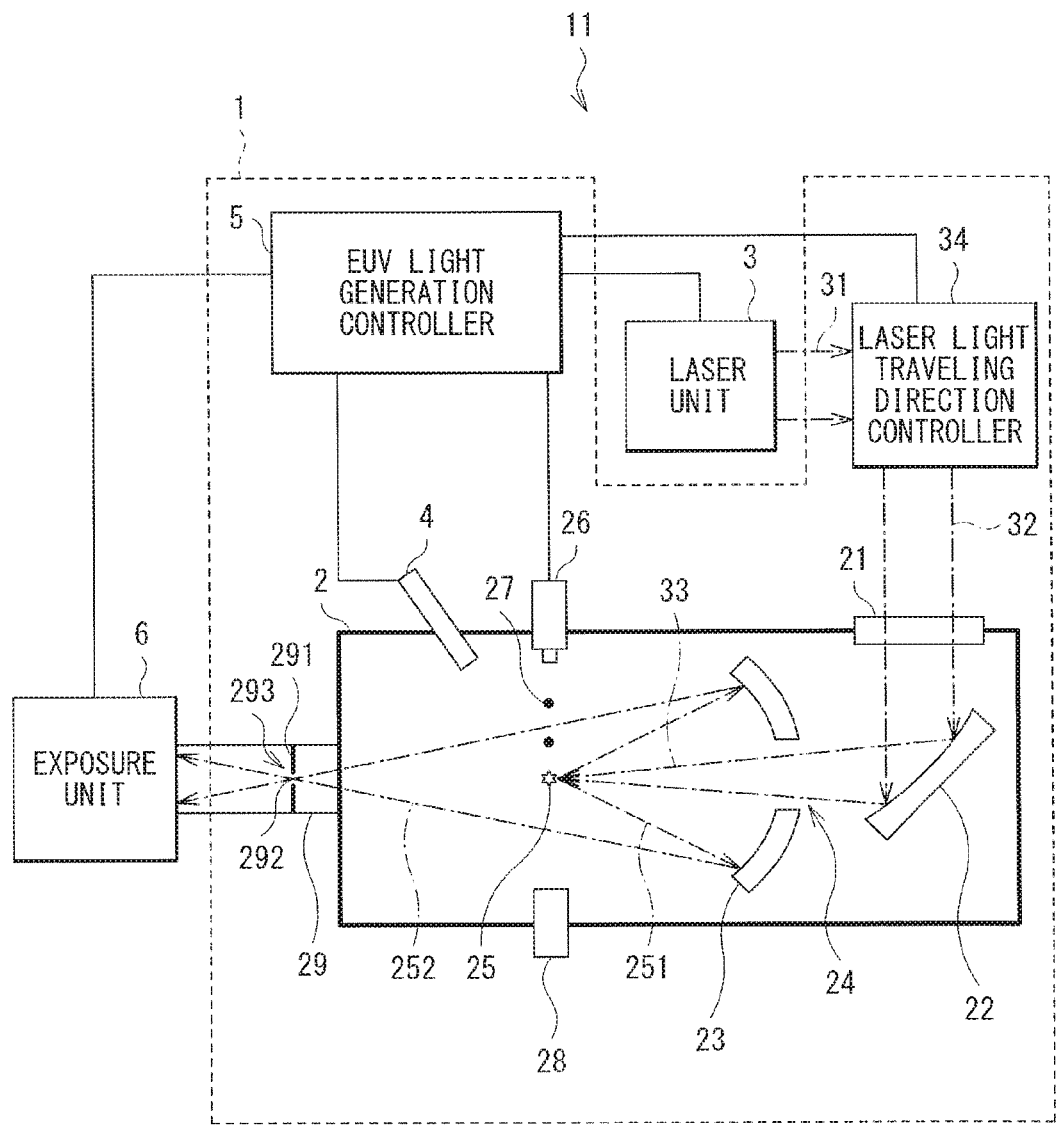
FIG. 1 schematically illustrates a configuration example of an exemplary LPP EUV light generating system.

FIG. 1 schematically illustrates a configuration of an exemplary laser produced plasma (LPP) EUV light generating system. An EUV light generating apparatus 1 may be used together with one or more laser units 3. In example embodiments disclosed in the present application, a system including the EUV light generating apparatus 1 and the laser unit 3 is referred to as an EUV light generating system 11. As illustrated in FIG. 1 and as described in detail below, the EUV light generating apparatus 1 may include a chamber 2 and, for example, a target feeder 26 serving as a target feeding unit. The chamber 2 may be sealable. The target feeder 26 may be so attached as to penetrate a wall of the chamber 2, for example. A material of a target substance to be supplied from the target feeder 26 may be tin, terbium, gadolinium, lithium, xenon, or any combination of two or more thereof without limitation.

The wall of the chamber 2 may be provided with one or more through holes. A window 21 may be provided at the through hole. Pulsed laser light 32 outputted from the laser unit 3 may pass through the window 21. An EUV light concentrating mirror 23 including a spheroidal reflection surface may be provided inside the chamber 2, for example. The EUV light concentrating mirror 23 may include a first focal point and a second focal point. A surface of the EUV light concentrating mirror 23 may be provided with a multilayer reflection film in which, for example, molybdenum and silicon are alternately stacked. For example, the EUV light concentrating mirror 23 may be preferably disposed so that the first focal point is located in a plasma generation region 25 or in the vicinity of the plasma generation region 25, and that the second focal point is located at an intermediate focus point (IF) 292. The intermediate focus point 292 may be a desired light concentration position defined by specifications of an exposure unit 6. The EUV light concentrating mirror 23 may be provided with a through hole 24 provided at a center part of the EUV light concentrating mirror 23 and through which pulsed laser light 33 may pass.

The EUV light generating apparatus 1 may include an EUV light generation controller 5. The EUV light generation controller 5 may include, for example, a target sensor 4. The target sensor 4 may detect one or more of presence, trajectory, position, and speed of a target 27. The target sensor 4 may include an image-pickup function.

The EUV light generating apparatus 1 may further include a connection section 29 that allows the inside of the chamber 2 to be in communication with the inside of the exposure unit 6. A wall 291 provided with an aperture 293 may be provided inside the connection section 29. The wall 291 may be disposed so that the aperture 293 is located at the second focal point of the EUV light concentrating mirror 23.

The EUV light generating apparatus 1 may further include a laser light traveling direction controller 34, a laser light concentrating mirror 22, a target collector 28, etc. The target collector 28 may collect the target 27. The laser light traveling direction controller 34 may include, in order to control the traveling direction of laser light, an optical device that defines a traveling direction of the laser light and an actuator that adjusts position, attitude, etc., of the optical device.

2.2 Operation

With reference to FIG. 1, pulsed laser light 31 outputted from the laser unit 3 may travel through the laser light traveling direction controller 34. The pulsed laser light 31 that has passed through the laser light traveling direction controller 34 may enter, as the pulsed laser light 32, the chamber 2 after passing through the window 21. The pulsed laser light 32 may travel inside the chamber 2 along one or more laser light paths, and then may be reflected by the laser light concentrating mirror 22. The pulsed laser light 32 reflected by the laser light concentrating mirror 22 may be applied, as the pulsed laser light 33, to one or more targets 27.

The target feeder 26 may be adapted to output the target 27 to the plasma generation region 25 inside the chamber 2. The target 27 may be irradiated with one or more pulses included in the pulsed laser light 33. The target 27 irradiated with the pulsed laser light may turn into plasma, and EUV light 251 may be radiated together with radiation light from the plasma. The EUV light 251 may be reflected and concentrated by the EUV light concentrating mirror 23. EUV light 252 reflected by the EUV light concentrating mirror 23 may travel through the intermediate focus point 292. The EUV light 252 having travelled through the intermediate focus point 292 may be outputted to the exposure unit 6. Note that a plurality of pulses included in the pulsed laser light 33 may be applied to one target 27.

The EUV light generation controller 5 may be adapted to manage a control of the EUV light generating system 11 as a whole. The EUV light generation controller 5 may be adapted to process, for example, data of an image of the target 27 picked up by the target sensor 4. For example, the EUV light generation controller 5 may be adapted to control one or both of output timing of the target 27 and an output direction of the target 27.

For example, the EUV light generation controller 5 may be adapted to control one or more of oscillation timing of the laser unit 3, the traveling direction of the pulsed laser light 32, and a concentration position of the pulsed laser light 33.

The above-described various controls are illustrative, and other control may be added as necessary.

3. Laser Unit Including Master Oscillator and Laser Amplifier

3.1 Configuration

Figure 2:
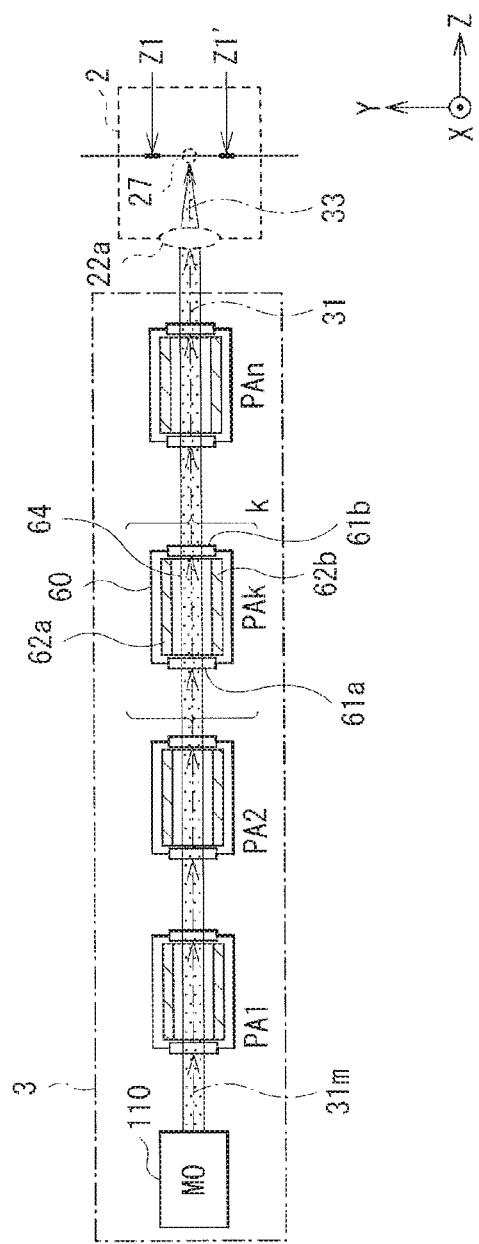
FIG. 2 schematically illustrates a configuration example of a laser unit including a master oscillator and laser amplifiers.

With reference to FIG. 2, description is given of a configuration example of the laser unit 3 used for an LPP EUV light generating apparatus. The LPP EUV light generating apparatus may include a $CO_2$ laser unit as the laser unit 3. The $CO_2$ laser unit used as the laser unit 3 may be required to output pulsed laser light of high pulse energy at high repetition frequency. The laser unit 3 may therefore include a master oscillator (MO) 110. The master oscillator 110 may output pulsed laser light 31m at high repetition frequency. The laser unit 3 may be disposed in a light path of the pulsed laser light 31m, and may include one or more laser amplifiers. The laser amplifier may amplify the pulsed laser light 31m. For example, as illustrated in FIG. 2, the laser unit 3 may include, as the laser amplifiers, a plurality of amplifiers PA1, PA2, . . . , PAk, . . . , and PAn.

The master oscillator 110 may be a laser oscillator including a Q switch, $CO_2$ laser gas as a laser medium, and an optical resonator. Alternatively, the master oscillator 110 may be a quantum cascade laser (QCL) that oscillates in an amplification wavelength band of a $CO_2$ laser.

The amplifiers PA1, PA2, . . . , PAk, . . . , and PAn may each be a laser amplifier that uses $CO_2$ laser gas as a laser medium. Each of the amplifiers PA1, PA2, . . . , PAk, . . . , and PAn may include a pair of electrodes 62a and 62b disposed in a laser chamber 60. The laser chamber 60 may contain $CO_2$ laser gas. Each of the amplifiers PA1, PA2, . . . , PAk, . . . , and PAn may include an unillustrated radio-frequency (RF) power supply that applies a voltage between the pair of electrodes 62a and 62b. The pair of electrodes 62a and 62b may be discharge electrodes that excite the laser medium by electric discharge in a discharge region 64. Each of the amplifiers PA1, PA2, . . . , PAk, . . . , and PAn may be provided with an input window 61a. The input window 61a may allow pulsed laser light from the outside to enter the inside of the laser chamber 60. Each of the amplifiers PA1, PA2, . . . , PAk, . . . , and PAn may be provided with an output window 61b. The output window 61b may allow amplified pulsed laser light to be outputted to the outside of the laser chamber 60. The amplifiers PA1, PA2, . . . , PAk, . . . , and PAn may be disposed in series in the light path of pulsed laser light 31m outputted from the master oscillator 110.

3.2 Operation

Each of the amplifiers PA1, PA2, . . . , PAk, . . . , and PAn may apply a voltage between the pair of electrodes 62a and 62b by its corresponding unillustrated RF power supply to cause electric discharge. Each of the amplifiers PA1, PA2, . . . , PAk, . . . , and PAn may operate the Q switch of the master oscillator 110 at a predetermined repetition frequency. As a result, the master oscillator 110 may output the pulsed laser light 31m at the predetermined repetition frequency.

Even when not receiving the pulsed laser light 31m outputted from the master oscillator 110, each of the amplifiers PA1, PA2, . . . , PAk, . . . , and PAn may cause electric discharge by means of the unillustrated RF power supply to excite the laser medium. The pulsed laser light 31m outputted from the master oscillator 110 may enter the first amplifier PA1 as seed light and pass through the inside of the first amplifier PA1 to be subjected to amplification, following which the thus-amplified pulsed laser light may be outputted. The amplified pulsed laser light outputted from the first amplifier PA1 may enter the second amplifier PA2 as seed light and pass through the inside of the second amplifier PA2 to be subjected to further amplification, following which the thus-amplified pulsed laser light may be outputted. Similarly, pulsed laser light outputted from a k−1th amplifier Pak−1 may enter the kth amplifier PAk as seed light and pass through the inside of the kth amplifier PAk to be subjected to further amplification, following which the thus-amplified pulsed laser light may be outputted. Then, pulsed laser light outputted from an n−1th amplifier Pan−1 may enter the nth amplifier PAn as seed light and pass through the inside of the nth amplifier PAn to be subjected to further amplification, following which the thus-amplified pulsed laser light may be outputted.

The pulsed laser light 31 outputted from the nth amplifier PAn may enter the chamber 2 serving as a plasma chamber in the EUV light generating apparatus 1 illustrated in FIG. 1, and the thus-entered pulsed laser light 31 may be concentrated on the plasma generation region 25 by a laser concentrating optical system 22a. The pulsed laser light 31 concentrated on the plasma generation region 25 may be applied as the pulsed laser light 33 to the target 27 in the plasma generation region 25. The target 27 irradiated with the pulsed laser light 33 may turn into plasma, and EUV light may be radiated from the plasma. Note that the laser light concentrating optical system 22a may include one reflective optical device or a plurality of reflective optical devices corresponding to the laser light concentrating mirror 22 illustrated in FIG. 1, or may be a refractive optical system including a lens.

3.3 Issues

Figure 3:
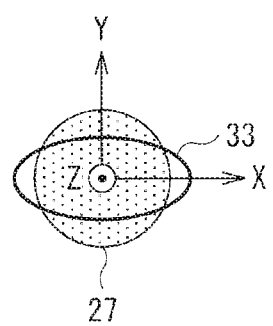
FIG. 3 schematically illustrates an example of a beam cross-sectional shape of laser light in the laser unit illustrated in FIG. 2.

FIG. 3 schematically illustrates an example of a beam cross-sectional shape of laser light in the laser unit 3 illustrated in FIG. 2. In the laser unit 3 illustrated in FIG. 2, the target 27 may be supplied at or in the vicinity of a beam waist of the laser light outputted from the laser unit 3. FIG. 3 schematically illustrates a beam cross-sectional shape, taken along a line Z1-Z1' of FIG. 2, at or in the vicinity of the beam waist of the laser light in a plane orthogonal to a light path axis of the laser light. In the laser unit 3 illustrated in FIG. 2, a beam cross-sectional shape of a concentrated beam of laser light applied to the target 27 may be an elliptical shape, as illustrated in FIG. 3, due to occurrence of astigmatism, for example. Upon application of the laser unit 3 to the EUV light generating apparatus 1 illustrated in FIG. 1, conversion efficiency CE into EUV light may be lowered in a case with the elliptical beam cross-sectional shape, as compared with a case with a circular beam cross-sectional shape. It may be therefore necessary to improve the beam cross-sectional shape of the concentrated beam upon irradiation of the target 27 with laser light.

4. First Embodiment

Laser Unit Including a Wavefront Adjuster 70

4.1 Configuration

Figure 4:
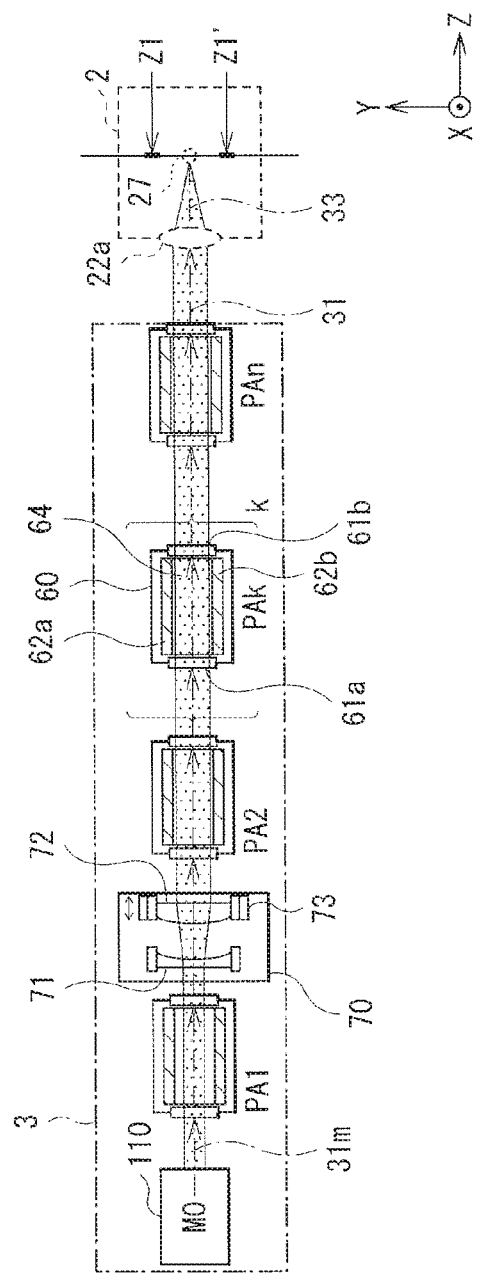
FIG. 4 schematically illustrates a configuration example of a laser unit including a wavefront adjuster.

FIG. 4 schematically illustrates a configuration example of the laser unit 3 including a wavefront adjuster 70 according to a first embodiment of the disclosure. As illustrated in FIG. 4, the wavefront adjuster 70 may be disposed in a light path of laser light between the first amplifier PA1 and the second amplifier PA2. Note that the configuration of the laser unit according to the first embodiment may be substantially similar to the configuration of the laser unit 3 illustrated in FIG. 2, except for the wavefront adjuster 70. In FIG. 4, a light path axis of the laser light may be in a Z direction. The plane orthogonal to the light path axis of the laser light may be an XY plane.

The wavefront adjuster 70 may adjust the beam cross-sectional shape of the concentrated beam of the laser light applied to the target 27 to be a substantially circular shape. The beam cross-sectional shape may be at or in the vicinity of the beam waist of the concentrated beam, and may be in the plane orthogonal to the light path axis. The wavefront adjuster 70 may include a cylindrical concave lens 71, a cylindrical convex lens 72, and a one-axis stage 73. The cylindrical concave lens 71 and the cylindrical convex lens 72 may be disposed in order in the light path of the laser light toward a light traveling direction.

The cylindrical concave lens 71 and the cylindrical convex lens 72 may vary a wavefront curvature of the laser light only in a certain single direction. In FIG. 4, the single direction may be a Y direction. The cylindrical concave lens 71 and the cylindrical convex lens 72 may be disposed so that focal positions of the cylindrical concave lens 71 and the cylindrical convex lens 72 in a YZ cross-section are substantially coincident with each other in the light path.

The wavefront adjuster 70 may include a movable optical member. The movable optical member may vary a beam diameter of the laser light in one direction that is orthogonal to the light path axis. The movable optical member may be the cylindrical convex lens 72. The cylindrical convex lens 72 may be movable along a direction of the light path axis by the one-axis stage 73.

4.2 Operation

Figure 5:
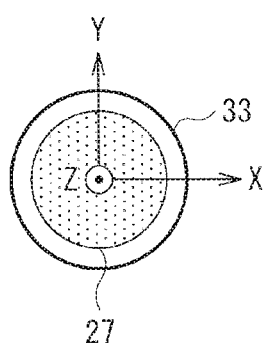
FIG. 5 schematically illustrates an example of a beam cross-sectional shape of laser light in the laser unit illustrated in FIG. 4.

FIG. 5 schematically illustrates an example of the beam cross-sectional shape of the laser light in the laser unit 3 illustrated in FIG. 4. In the laser unit 3 illustrated in FIG. 4, the target 27 may be supplied at or in the vicinity of the beam waist of the laser light outputted from the laser unit 3. FIG. 5 schematically illustrates a beam cross-sectional shape, taken along a line Z1-Z1' of FIG. 4, at or in the vicinity of the beam waist in the plane orthogonal to the light path axis of the laser light.

In the laser unit 3 illustrated in FIG. 4, the cylindrical convex lens 72 in the wavefront adjuster 70 may be moved along the direction of the light path axis by the one-axis stage 73 to vary the wavefront curvature in the Y direction of the laser light, thereby causing variation in the beam diameter in the Y direction of the laser light. The beam diameter in the Y direction of the laser light may be increased, for example. As a result, the beam cross-sectional shape of the concentrated beam of the laser light applied to the target 27 may be adjusted from, for example, an ellipsoid shape as illustrated in FIG. 3 to be a substantially circular shape as illustrated in FIG. 5.

4.3 Workings

According to the first embodiment, the wavefront curvature in the Y direction of the laser light may be adjustable. This may make it possible to improve the beam cross-sectional shape of the laser light applied to the target 27 to be a substantially circular shape. As a result, the concentrated beam of the laser light may be applied to the target 27 as a whole. Thus, in a case where the laser unit 3 is applied to the EUV light generating apparatus 1 illustrated in FIG. 1, the conversion efficiency CE into EUV light may be improved.

4.4 Modification Example

FIG. 4 illustrates the configuration example in which the wavefront adjuster 70 is disposed between the first amplifier PA1 and the second amplifier PA2. However, the position of the wavefront adjuster 70 is not limited thereto. The wavefront adjuster 70 may be disposed at any other position between the master oscillator 110 and the laser concentrating optical system 22a in the light path of the laser light.

5. Second Embodiment

Laser Unit Including a Beam Characteristic Measuring Device 80

5.1 Configuration

Figure 6:
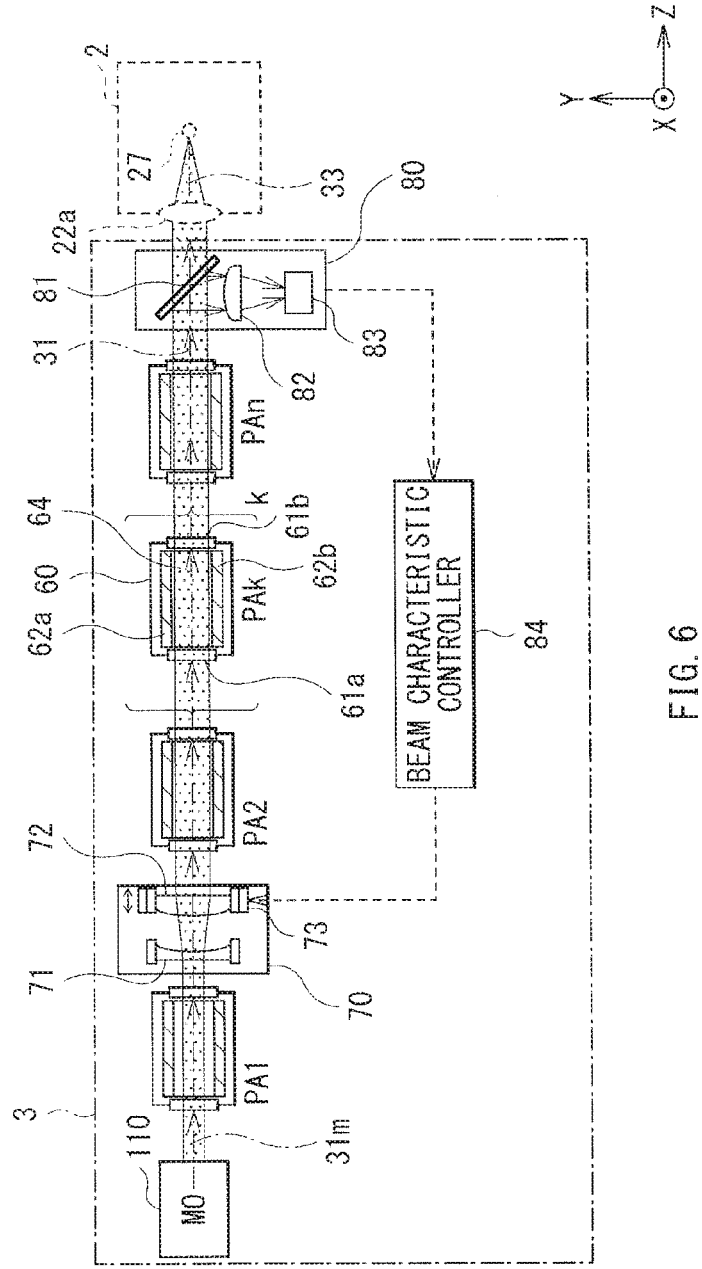
FIG. 6 schematically illustrates a configuration example of a laser unit including a beam characteristic measuring device.

FIG. 6 schematically illustrates a configuration example of the laser unit 3 including a beam characteristic measuring device 80 according to a second embodiment of the disclosure. The laser unit 3 may include the beam characteristic measuring device 80 and a beam characteristic controller 84, as illustrated in FIG. 6. Note that the configuration of the laser unit 3 according to the second embodiment may be substantially similar to the configuration of the laser unit illustrated in FIG. 4, except for the beam characteristic measuring device 80 and the beam characteristic controller 84. In FIG. 6, the light path axis of laser light may be in the Z direction. The plane orthogonal to the light path axis of the laser light may be the XY plane.

The beam characteristic measuring device 80 may be a detecting section that detects the beam cross-sectional shape at or in the vicinity of the beam waist of the laser light. The beam characteristic measuring device 80 may be disposed at a downstream of the wavefront adjuster 70 in the light path of the laser light. More specifically, the beam characteristic measuring device 80 may be disposed in the light path of the laser light between the nth amplifier PAn and the laser concentrating optical system 22a. The beam characteristic measuring device 80 may include a beam splitter 81, a light concentrating lens 82, and an image sensor 83.

The beam splitter 81 may split the laser light into laser light to be applied to the target 27 and laser light to be measured. The laser light to be measured may be used to detect the beam cross-sectional shape. The beam splitter 81 may be disposed in the light path of the laser light between the nth amplifier PAn and the laser concentrating optical system 22a. The beam splitter 81 may be so disposed as to allow the laser light to be measured to enter the light concentrating lens 82. The light concentrating lens 82 may be a light concentrator that concentrates the laser light onto the image sensor 83. The image sensor 83 may be a detector that detects the beam cross-sectional shape of the laser light. The image sensor 83 may be, for example, a two-dimensional image sensor. The image sensor 83 may be disposed at a focal position of the light concentrating lens 82.

The beam characteristic controller 84 may be a controller that controls the wavefront adjuster 70, based on a result of detection by the beam characteristic measuring device 80. The beam characteristic controller 84 may be coupled to the image sensor 83 through a signal line, and may receive data of the result of the detection by the beam characteristic measuring device 80. The beam characteristic controller 84 may be coupled to the wavefront adjuster 70 as well through a signal line to transmit a control signal to the wavefront adjuster 70.

5.2 Operation

The beam characteristic measuring device 80 may detect the beam cross-sectional shape of the concentrated beam of the laser light by concentrating, by the light concentrating lens 82, the laser light to be measured onto the image sensor 83. The laser light to be measured has been split off by the beam splitter 81. The beam characteristic controller 84 may transmit the control signal to the wavefront adjuster 70, based on a result detected by the beam characteristic measuring device 80. The control signal may be a signal that instructs varying of the position of the cylindrical convex lens 72 in the wavefront adjuster 70. Further, the control signal may be a signal that controls a moving amount of the cylindrical convex lens 72 by the one-axis stage 73. The beam characteristic controller 84 may control the position of the cylindrical convex lens 72 so that, for example, the beam diameter in the Y direction and a beam diameter in an X direction are substantially the same as each other in the beam cross-sectional shape of the laser light concentrated by the light concentrating lens 82.

5.3 Workings

According to the second embodiment, the wavefront adjuster 70 may be controlled, based on a result of monitoring the beam cross-sectional shape of the laser light by the beam characteristic measuring device 80, so that the beam cross-sectional shape of the laser light is adjusted to be a target shape, for example, a substantially circular shape. Accordingly, even if an operating load of the laser unit 3 is varied to vary the beam cross-sectional shape of the laser light with the passage of time, the beam cross-sectional shape may be so stabilized as to be constantly close to the target shape.

5.4 Modification Example

FIG. 6 illustrates the configuration example in which the beam characteristic measuring device 80 is disposed between the nth amplifier PAn and the laser concentrating optical system 22a. However, the position of the beam characteristic measuring device 80 is not limited thereto. The beam characteristic measuring device 80 may be disposed at any other position between the wavefront adjuster 70 and the laser concentrating optical system 22a in the light path of the laser light.

6. Third Embodiment

Laser Unit Including a Slab Amplifier 66

6.1 Configuration

Figure 7:
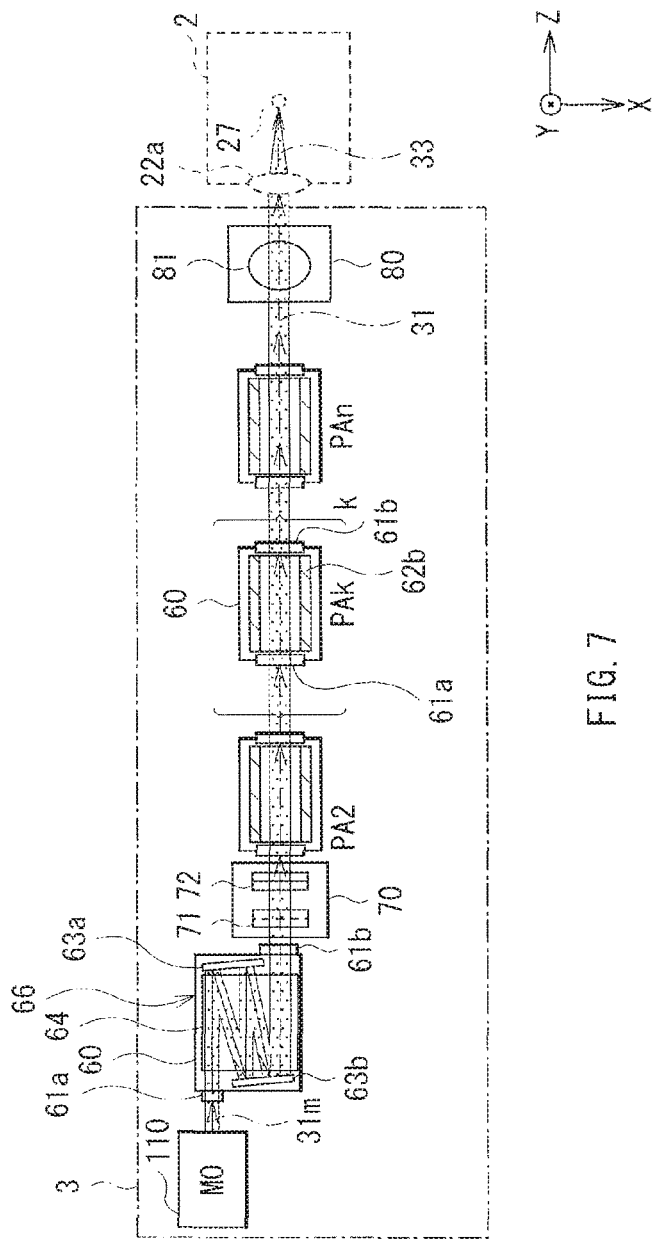
FIG. 7 schematically illustrates a configuration example of a laser unit including a slab amplifier, as viewed in a Y direction.
Figure 8:
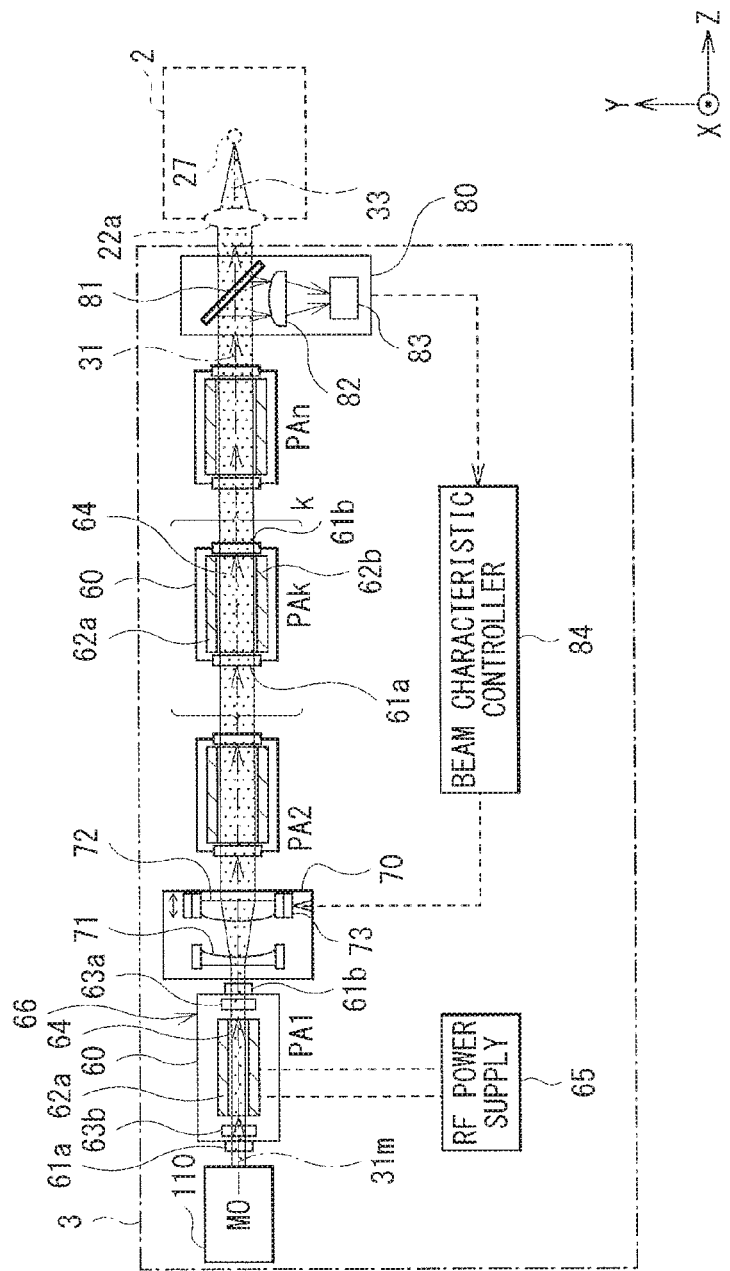
FIG. 8 schematically illustrates a configuration example of the laser unit including the slab amplifier, as viewed in an X direction.

FIGS. 7 and 8 schematically illustrate a configuration example of the laser unit 3 including a slab amplifier 66 according to a third embodiment of the disclosure. FIG. 7 schematically illustrates a configuration example of the laser unit 3, as viewed in the Y direction. FIG. 8 schematically illustrates a configuration example of the laser unit 3, as viewed in the X direction. In the laser unit 3, the amplifier PA1 may be configured of the slab amplifier 66, as illustrated in FIGS. 7 and 8. Note that the configuration of the laser unit 3 according to the third embodiment may be substantially similar to the configuration of the laser unit 3 illustrated in FIG. 6, except for the amplifier PAL In FIGS. 7 and 8, the light path axis of laser light may be in the Z direction. The plane orthogonal to the light path axis of the laser light may be the XY plane.

The slab amplifier 66 may include a laser chamber 60, an input window 61a, an output window 61b, a pair of electrodes 62a and 62b, a first mirror 63a, a second mirror 63b, and an RF power supply 65. In the slab amplifier 66, the laser chamber 60 may contain a $CO_2$ laser gas as a laser medium. In the slab amplifier 66, the pair of electrodes 62a and 62b may be two tabular discharge electrodes disposed to oppose each other. Unillustrated cooling water may flow through the pair of electrodes 62a and 62b. An electrode interval between the pair of electrodes 62a and 62b may be, for example, 1.5 mm to 3 mm both inclusive. The RF power supply 65 may supply an RF voltage to the pair of electrodes 62a and 62b.

In the slab amplifier 66, a discharge direction of the pair of electrodes 62a and 62b may be the same as an opposing direction of the pair of electors 62a and 62b. The opposing direction of the pair of the electrodes 62a and 62b may be in the Y direction. A direction of free space between the pair of electrodes 62a and 62b may be in the X direction. The opposing direction of the pair of electrodes 62a and 62b may be substantially the same as a direction of adjustment of the beam diameter of the laser light by the wavefront adjuster 70.

6.2 Operation

In the slab amplifier 66, laser light to serve as seed light may enter the inside of the laser chamber 60 through the input window 61a while supplying the RF voltage from the RF power supply 65 to the pair of electrodes 62a and 62b. The entered seed light may be so reflected by the first mirror 63a and the second mirror 63b as to make multiple passes in the discharge region 64. The entered seed light may make multiple passes through the laser medium excited between the pair of electrodes 62a and 62b to be subjected to amplification. The thus-amplified seed light may be outputted as amplified laser light from the output window 61b.

The laser light outputted from the slab amplifier 66 may involve a larger beam diameter in, for example, the X direction that is the direction of the free space than the beam diameter in, for example, the Y direction that is the discharge direction, which may cause the beam cross-sectional shape of the laser light to be an elliptical shape. The wavefront adjuster 70 may adjust the beam cross-sectional shape of the laser light outputted from the slab amplifier 66 to be a substantially circular shape by causing the opposing direction of the pair of electrodes 62a and 62b to be substantially the same as the direction of adjustment of the beam diameter of laser light by the wavefront adjuster 70.

Moreover, as with the foregoing second embodiment, the wavefront adjuster 70 may be controlled by the beam characteristic measuring device 80 and the beam characteristic controller 84, based on a result of monitoring the beam cross-sectional shape of the laser light, so that the beam cross-sectional shape of the laser light is adjusted to be a substantially circular shape.

6.3 Workings

According to the third embodiment, even when the beam cross-sectional shape of the laser light outputted from the slab amplifier 66 is an elliptical shape, the wavefront adjuster 70 may improve the beam cross-sectional shape to be a substantially circular shape.

6.4 Modification Example

The laser unit 3 may not be limited to the $CO_2$ laser unit, but may be a solid-state laser unit. For example, the master oscillator 110 may include a mode-locking laser and an optical shutter. The mode-locking laser may include a Nd:$YVO_4$ crystal or a YAG crystal. In this case, the optical shutter may include a polarizer and an electro-optic (EO) crystal Pockels cell. The amplifier PA1 may include a slab Nd:$YVO_4$ crystal or a slab YAG crystal. Each of the amplifiers PA2, . . . , PAk, PAn may include a rod Nd:$YVO_4$ crystal or a rod YAG crystal. In this case, a direction in which the wavefront adjuster 70 adjusts the wavefront curvature to vary the beam diameter may be substantially the same as a short-axis direction of a slab crystal.

Moreover, in a case where the master oscillator 110 is a slab laser unit, the wavefront adjuster 70 may be disposed between the master oscillator 110 and the amplifier PA1.

7. Fourth Embodiment

Variations of the Wavefront Adjuster 70

In a fourth embodiment, description is given of variations of the wavefront adjuster 70 applicable to, for example, the laser units 3 according to the foregoing second embodiment and the foregoing third embodiment.

7.1 First Configuration Example

Example Including a Combination of a Plurality of Cylindrical Lenses

7.1.1 Configuration

Figure 9:
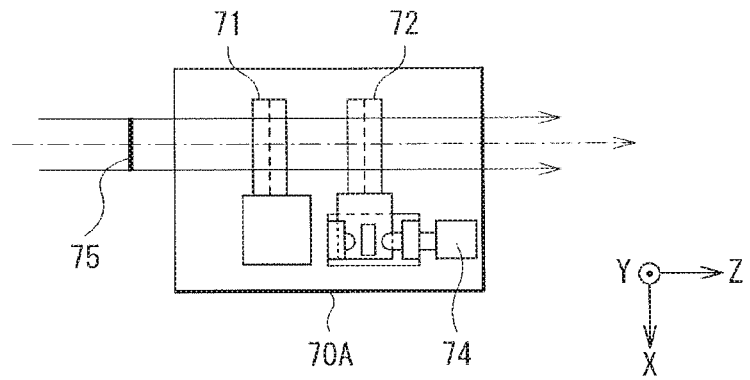
FIG. 9 schematically illustrates an example of a wavefront adjuster including a combination of a plurality of cylindrical lenses, as viewed in the Y direction.
Figure 10:
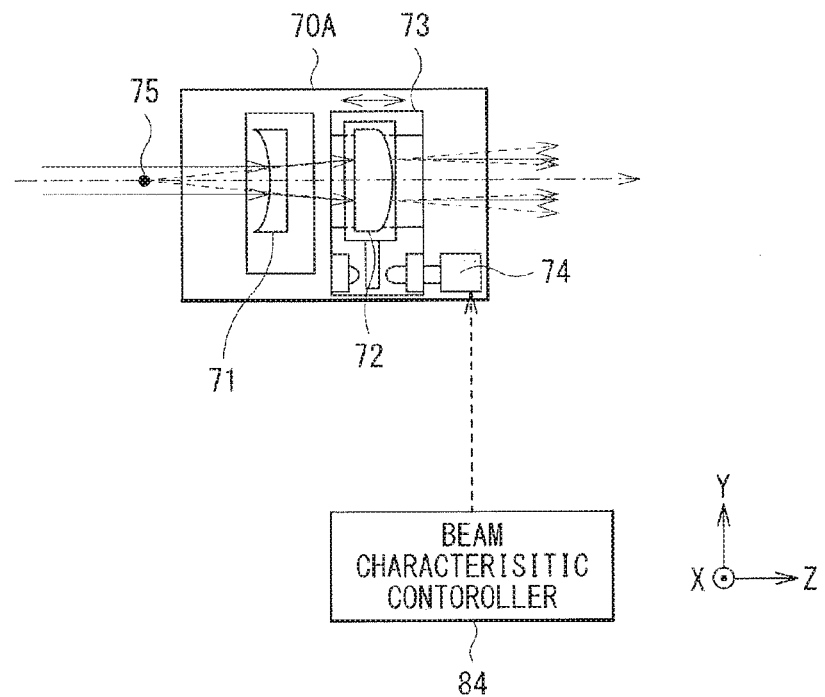
FIG. 10 schematically illustrates an example of the wavefront adjuster including the combination of the cylindrical lenses, as viewed in the X direction.

FIG. 9 schematically illustrates an example of a wavefront adjuster 70A including a combination of a plurality of cylindrical lenses, as viewed in the Y direction. FIG. 10 schematically illustrates an example of the wavefront adjuster 70A including the combination of the cylindrical lenses, as viewed in the X direction.

The wavefront adjuster 70A illustrated in FIGS. 9 and 10 may include the cylindrical concave lens 71, the cylindrical convex lens 72, and the one-axis stage 73, as with the wavefront adjuster 70 described in the foregoing first embodiment. The wavefront adjuster 70A may further include an automatic micrometer 74. The automatic micrometer 74 may be controlled by the beam characteristic controller 84, and may be adapted to drive the one-axis stage 73.

The cylindrical convex lens 72 may be a movable optical member that is movable along the Z direction by the one-axis stage 73. The Z direction may be the direction of the light path axis. The moving amount of the cylindrical convex lens 72 by the one-axis stage 73 may be controlled by the beam characteristic controller 84.

7.1.2 Operation and Workings

The cylindrical concave lens 71 and the cylindrical convex lens 72 may be so disposed as to allow focal positions 75 of the cylindrical concave lens 71 and the cylindrical convex lens 72 in an YZ cross-section to be substantially coincident with each other in the light path, as illustrated in FIG. 10, thereby collimating entered laser light by the wavefront adjuster 70A. Moreover, in the wavefront adjuster 70A, the position of the cylindrical convex lens 72 may be moved along the Z direction to control the wavefront curvature in the Y direction of the laser light. Thus, an adjustment amount of the beam diameter in the Y direction may be controlled.

7.1.3 Modification Example

In the configuration example illustrated in FIGS. 9 and 10, the position of the cylindrical convex lens 72 is varied to vary the beam diameter in the Y direction. Alternatively, the position of the cylindrical convex lens 71 may be varied. Moreover, the positions of the cylindrical concave lens 71 and the cylindrical convex lens 72 may be both varied. In other words, a distance between the cylindrical concave lens 71 and the cylindrical convex lens 72 may be controlled.

Further, the configuration example illustrated in FIGS. 9 and 10 is directed to an example of a combination of the cylindrical concave lens 71 and the cylindrical convex lens 72. Alternatively, a cylindrical convex lens may be provided in place of the cylindrical concave lens 71. In this case, the two cylindrical convex lenses may be disposed so that the focal positions of the two cylindrical convex lenses are substantially coincident with each other, and a distance between the cylindrical convex lenses may be controlled.

7.2 Second Configuration Example

First Example Including a Combination of a Plurality of Cylindrical Mirrors

7.2.1 Configuration

Figure 11:
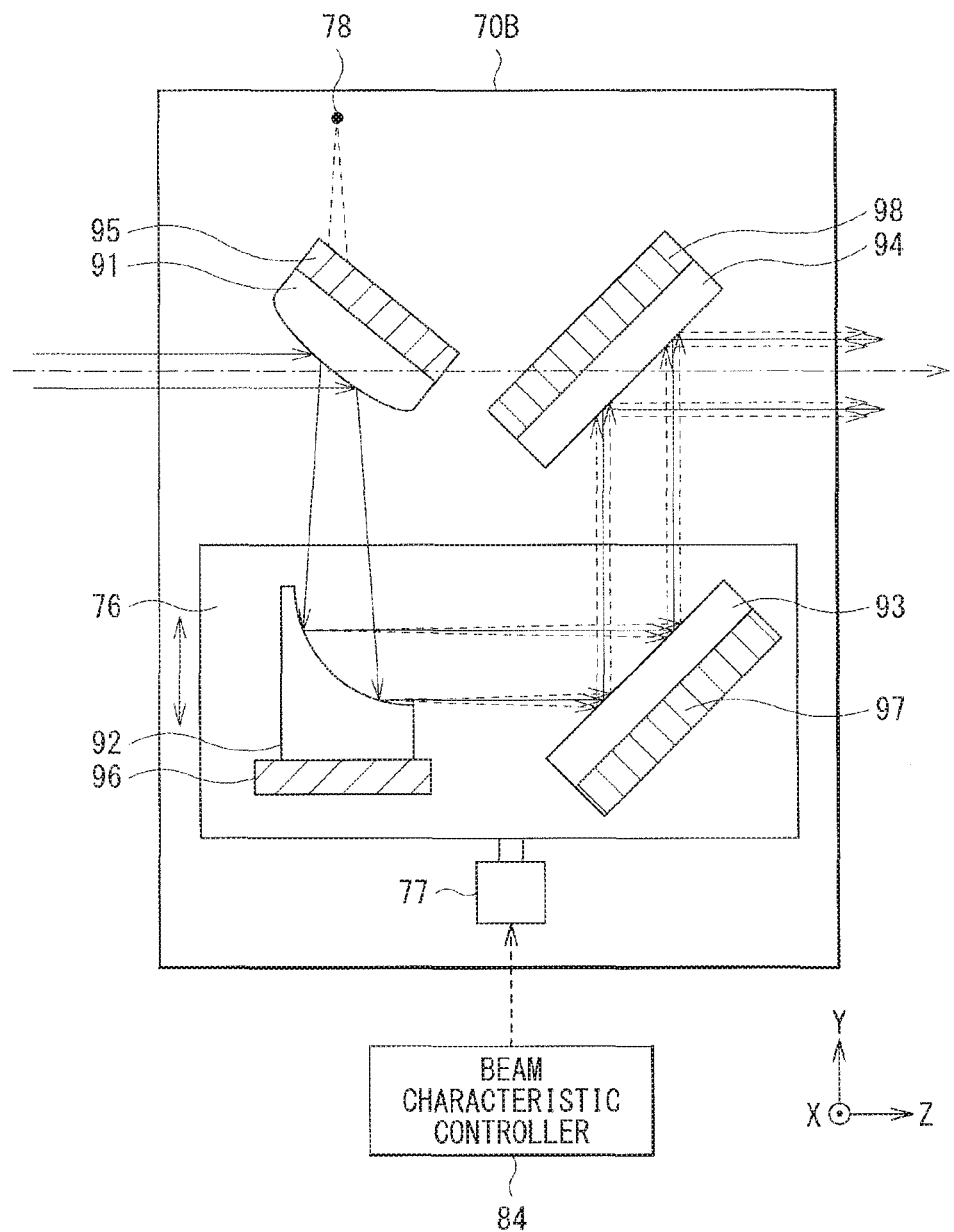
FIG. 11 schematically illustrates a first example of a wavefront adjuster including a combination of a plurality of cylindrical mirrors.

FIG. 11 schematically illustrates a first example of a wavefront adjuster 70B including a combination of a plurality of cylindrical mirrors.

The wavefront adjuster 70B may include a convex mirror 91, a concave mirror 92, a first high reflection mirror 93, and a second high reflection mirror 94 in order toward a traveling direction of laser light. The wavefront adjuster 70B may further include a one-axis stage 76, a pulse motor 77, and mirror holders 95, 96, 97, and 98.

Each of the convex mirror 91, the concave mirror 92, the first high reflection mirror 93, and the second high reflection mirror 94 may be disposed at an angle of 45° with respect to the light path axis. The convex mirror 91 may be held by the mirror holder 95. The concave mirror 92 may be held by the mirror holder 96. The first high reflection mirror 93 may be held by the mirror holder 97. The second high reflection mirror 94 may be held by the mirror holder 98.

The convex mirror 91 may be a cylindrical off-axis parabolic convex mirror. The concave mirror 92 may be a cylindrical off-axis parabolic concave mirror. The convex mirror 91 and the concave mirror 92 may be so disposed as to allow focal positions 78 of the convex mirror 91 and the concave mirror 92 to be substantially coincident with each other. The first high reflection mirror 93 and the second high reflection mirror 94 may reflect laser light reflected by the concave mirror 92 to an exit axis direction of the laser light in the wavefront adjuster 70B so as to allow the exit axis direction of the laser light to be coincident with an entry axis direction of the laser light.

The concave mirror 92 and the first high reflection mirror 93 may be disposed on a plate on the one-axis stage 76 with the mirror holders 96 and 97 in between. The one-axis stage 76 may be so disposed as to move along the Y direction. The pulse motor 77 may be controlled by the beam characteristic controller 84 to drive the one-axis stage 76.

An unillustrated cooling water pipe may be provided in each of substrates of the convex mirror 91, the concave mirror 92, the first high reflection mirror 93, and the second high reflection mirror 94 to exhaust, by means of cooling water, heat absorbed by each of the mirrors.

7.2.2 Operation and Workings

In the wavefront adjuster 70B, the wavefront curvature in the Y direction of the laser light may be controlled by moving the one-axis stage 76 along the Y direction. Accordingly, the adjustment amount of the beam diameter in the Y direction may be controlled. In this configuration example, the concave mirror 92 and the first high reflection mirror 93 are moved together along the Y direction, and variations in an entry axis and an exit axis of the laser light in the wavefront adjuster 70B may be therefore reduced. In a configuration using a transmissive optical device as with the configuration example in FIGS. 9 and 10, cooling may be difficult, which may cause a temperature difference, resulting in wavefront distortion. In contrast, the configuration example uses the reflective optical device to allow for a configuration in which unillustrated cooling water flows through the substrate of the optical device. Accordingly, even when high-power laser light, for example, laser light of about 5 kW to about 40 kW both inclusive enters the wavefront adjuster 70B, the wavefront curvature may be stably controlled.

7.2.3 Modification Example

The configuration example illustrated in FIG. 11 is an example of a combination of the convex mirror 91 and the concave mirror 92. Alternatively, a cylindrical off-axis parabolic concave mirror may be provided in place of the convex mirror 91. In this case, the two concave mirrors may be disposed so that the focal positions 78 of the concave mirrors are substantially coincident with each other, and the concave mirror 92 and the first high reflection mirror 93 may be controlled by the one-axis stage 76 similarly.

Moreover, a configuration may be employed in which the positions of the first high reflection mirror 93 and the concave mirror 92 in FIG. 11 are replaced by each other. Even in this case, as long as the convex mirror 91 and the concave mirror 92 are disposed so that the focal positions 78 of the convex mirror 91 and the concave mirror 92 are substantially coincident with each other, the wavefront curvature in the Y direction of the laser light may be controlled by moving the one-axis stage 76 along the Y direction.

7.3 Third Configuration Example

Second Example Including a Combination of a Plurality of Cylindrical Mirrors

7.3.1 Configuration

Figure 12:
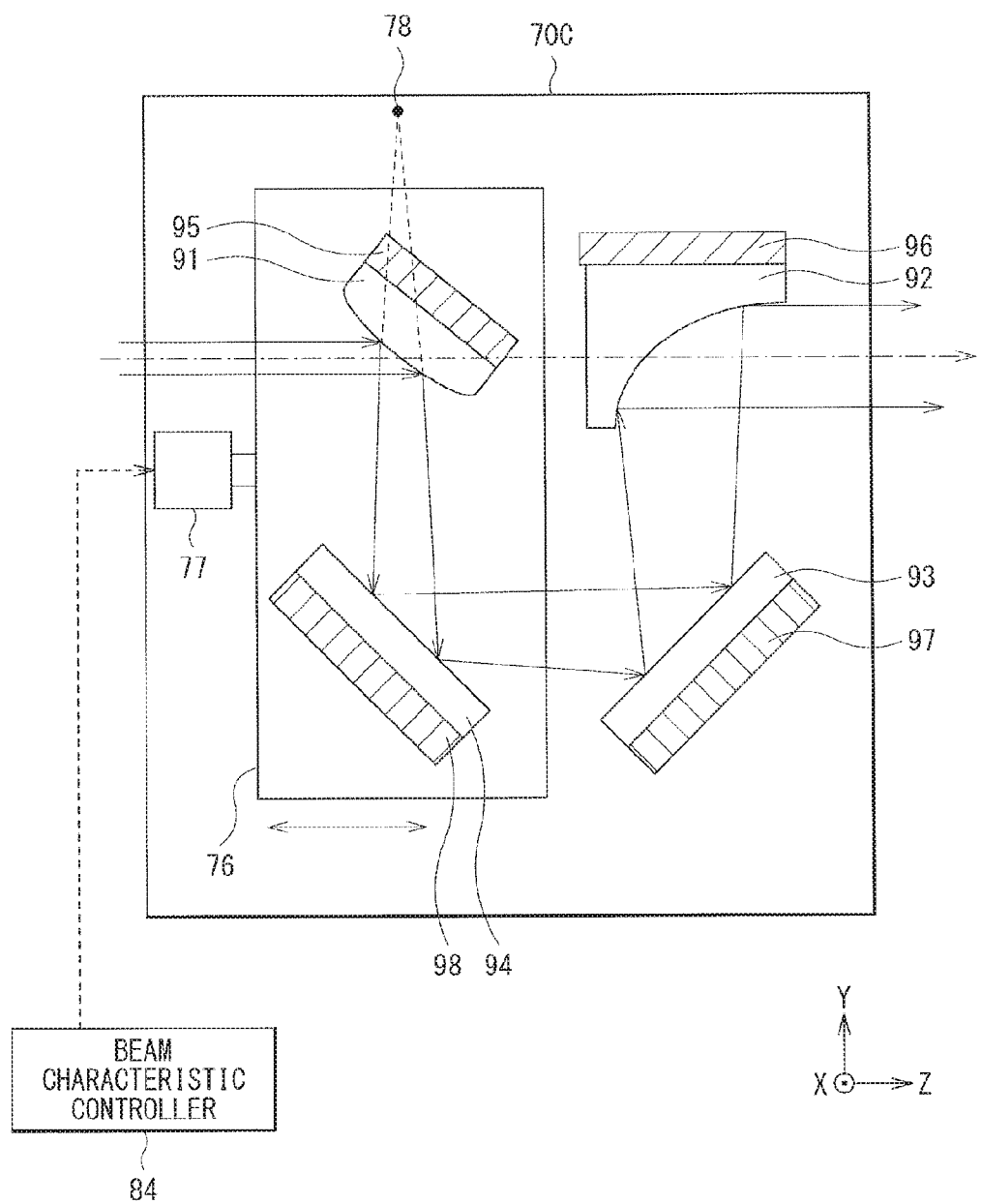
FIG. 12 schematically illustrates a second example of the wavefront adjuster including the combination of the cylindrical mirrors.

FIG. 12 schematically illustrates a second example of a wavefront adjuster 70C including a combination of a plurality of cylindrical mirrors.

As illustrated in FIG. 12, a configuration of the wavefront adjuster 70C may be similar to the configuration of the wavefront adjuster 70B illustrated in FIG. 11 with exception that the positions of the concave mirror 92 and the second high reflection mirror 94 are replaced by each other. In other words, in the wavefront adjuster 70C, the convex mirror 91, the first high reflection mirror 93, the second high reflection mirror 94, and the concave mirror 92 may be disposed in order toward the traveling direction of the laser light.

In the wavefront adjuster 70C illustrated in FIG. 12, the convex mirror 91 and the concave mirror 92 may be disposed so that the focal positions 78 of the convex mirror 91 and the concave mirror 92 are substantially coincident with each other. The convex mirror 91 and the second high reflection mirror 94 may be disposed on the plate on the one-axis stage 76 with the mirror holders 95 and 98 in between. The one-axis stage 76 may be so disposed as to move along the Z direction.

7.3.2 Operation and Workings

In the wavefront adjuster 70C, the wavefront curvature in the Y direction of the laser light may be controlled by moving the one-axis stage 76 along the Z direction. Accordingly, the adjustment amount of the beam diameter in the Y direction may be controlled. In this configuration example, the convex mirror 91 and the second high reflection mirror 94 are moved together along the Z direction, and variations in an entry axis and an exit axis of the laser light in the wavefront adjuster 70C may be therefore reduced.

8. Fifth Embodiment

Variations of the Beam Characteristic Measuring Device 80

In a fifth embodiment, description is given of variations of the beam characteristic measuring device 80 applicable to, for example, the laser units 3 according to the foregoing second embodiment and the foregoing third embodiment.

8.1 First Configuration Example

Example in which a Beam Profile is Measured by One Image Sensor 83

8.1.1 Configuration

Figure 13:
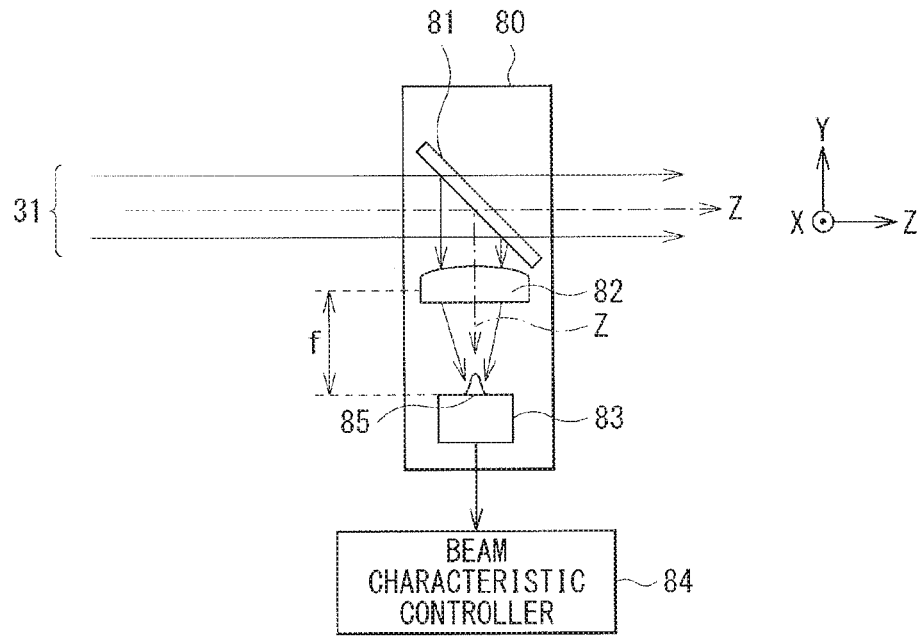
FIG. 13 schematically illustrates a configuration example of a beam characteristic measuring device that measures a beam profile by means of one image sensor.

FIG. 13 schematically illustrates a configuration example of the beam characteristic measuring device 80 that measures a beam profile by means of one image sensor 83. The beam characteristic measuring device 80 illustrated in FIG. 13 may include a substantially similar configuration to the configuration of the beam characteristic measuring device 80 illustrated in FIG. 6. The beam characteristic measuring device 80 illustrated in FIG. 13 may include the beam splitter 81, the light concentrating lens 82, and the image sensor 83. The image sensor 83 may be a two-dimensional image sensor. The two-dimensional image sensor may be a two-dimensional array of pyroelectric elements in a case where the laser light to be measured is $CO_2$ laser light. The two-dimensional image sensor may be a two-dimensional photodiode array in a case where the laser light to be measured is solid-state laser light. The image sensor 83 may be disposed at a position of a focal length f of the light concentrating lens 82.

8.1.2 Operation

Figure 14:
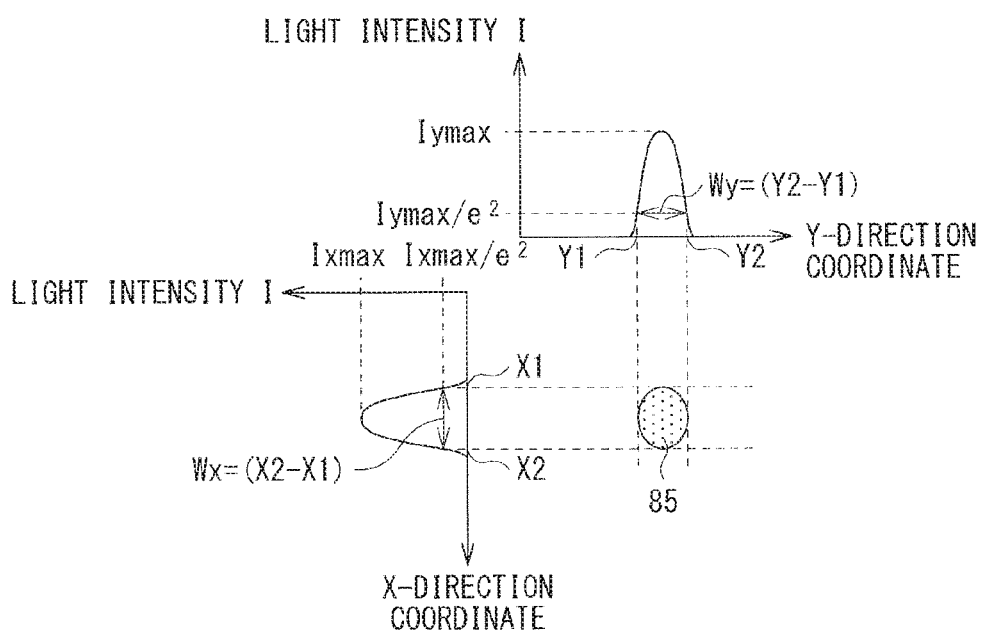
FIG. 14 schematically illustrates an example of a beam profile image to be measured by the beam characteristic measuring device illustrated in FIG. 13.

FIG. 14 schematically illustrates an example of a beam profile image 85 to be measured by the beam characteristic measuring device 80 illustrated in FIG. 13. The beam profile image 85 may be an image of a beam cross-sectional shape of the laser light to be measured. The beam profile image 85 may be formed on the image sensor 83 by the light concentrating lens 82.

FIG. 14 schematically illustrates the beam profile image 85, and a light intensity distribution in the X direction and a light intensity distribution in the Y direction of the beam profile image 85. A width (diameter) Wx in the X direction of the concentrated beam of the laser light may be determined by Wx=(X2−X1), where X1 and X2 are defined as X-direction coordinate positions at which light intensity is $1/e^2$ of a maximum value Ixmax of light intensity in the X direction. A width (diameter) Wy in the Y direction of the concentrated beam of the laser light may be determined by Wy=(Y2−Y1), where Y1 and Y2 are defined as Y-direction coordinate positions at which light intensity is $1/e^2$ of a maximum value Iymax of light intensity in the Y direction.

A beam spread angle θwx in the X direction and a beam spread angle θwy in the Y direction may be determined by the following expressions (1) and (2).

$$\theta wx = Wx/f \tag{1}$$

$$\theta wy = Wy/f \tag{2}$$

The beam characteristic controller 84 may control the wavefront adjuster 70, based on a result detected by the beam characteristic measuring device 80 so that θwx=θwy is established.

Note that the widths (diameters) Wx and Wy of the concentrated beam of the laser light may be determined not only by widths (diameters) on the basis of $1/e^2$ of the maximum values Ixmax and Iymax of light intensity, but also, for example, by coordinate positions at which light intensity is a certain percentage, for example, 5% to 10% both inclusive of the maximum values Ixmax and Iymax.

8.1.3 Workings

According to the configuration example, beam divergence that is a parameter value of the concentrated beam of the laser light may be measured, based on the beam profile image 85 formed on the one image sensor 83.

8.2 Second Configuration Example

Example in which a Beam Profile is Measured by Two Image Sensors 83A and 83B

8.2.1 Configuration

Figure 15:
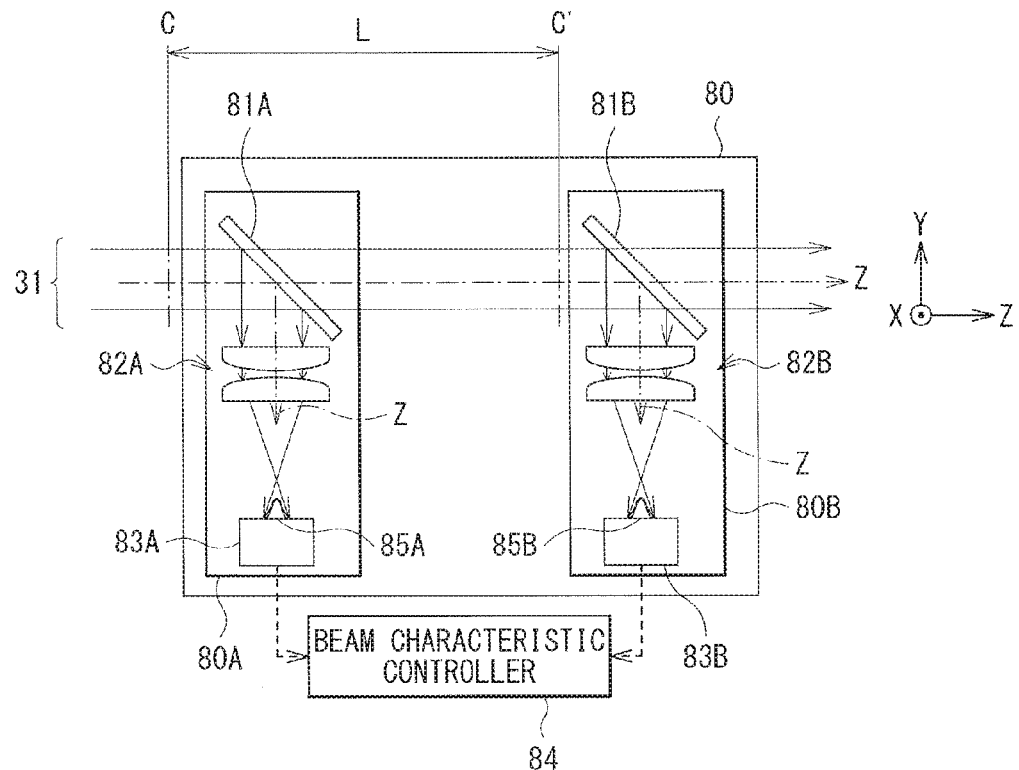
FIG. 15 schematically illustrates a configuration example of a beam characteristic measuring device that measures a beam profile by means of two image sensors.

FIG. 15 schematically illustrates a configuration example of the beam characteristic measuring device 80 that measures a beam profile by means of two image sensors 83A and 83B. The beam characteristic measuring device 80 illustrated in FIG. 15 may include a first beam profiler 80A and a second beam profiler 80B. A distance between a beam measurement position C by the first beam profiler 80A and a beam measurement position C' by the second beam profiler 80B may be defined as L.

The first beam profiler 80A may include a first beam splitter 81A, a first transfer optical system 82A, and a first two-dimensional image sensor 83A. The second beam profiler 80B may include a second beam splitter 81B, a second transfer optical system 82B, and a second two-dimensional image sensor 83B.

The first transfer optical system 82A and the second transfer optical system 82B may be adapted to transfer an image of a beam of the laser light to be measured under a predetermined magnification of 1/M. The first image sensor 83A may be disposed at a position where an image of a beam at the measurement position C transferred under the predetermined magnification of 1/M by the first transfer optical system 82A is to be measured. The second image sensor 83B may be disposed at a position where an image of the beam at the measurement position C' transferred under the predetermined magnification of 1/M by the second transfer optical system 82B is to be measured.

8.2.2 Operation

Figure 16:
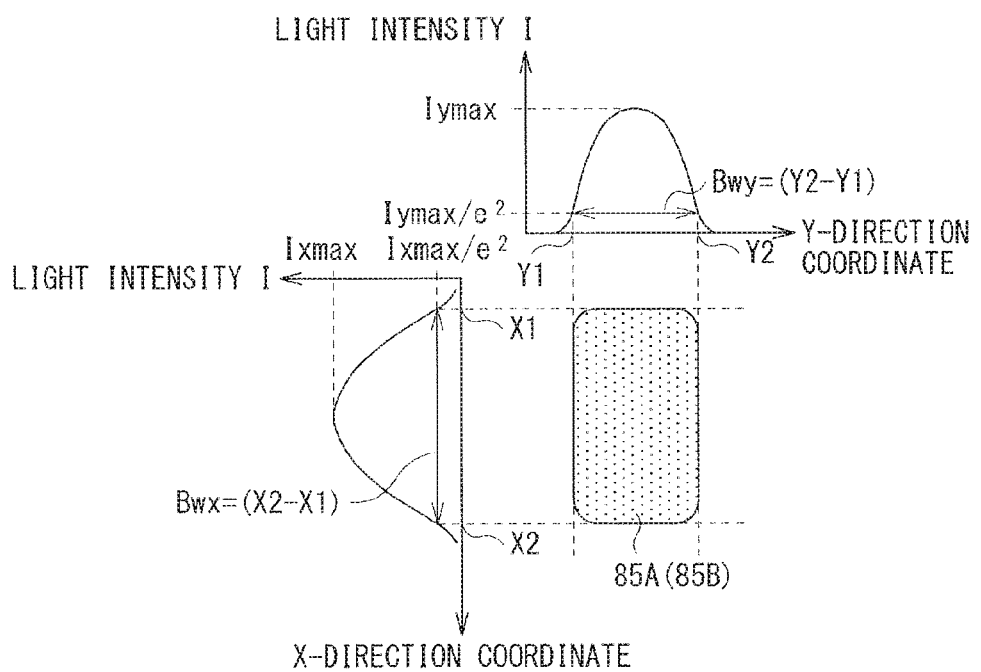
FIG. 16 schematically illustrates an example of a beam profile image to be measured by the beam characteristic measuring device illustrated in FIG. 15.

FIG. 16 schematically illustrates an example of a first beam profile image 85A to be measured by the first beam profiler 80A of the beam characteristic measuring device 80 illustrated in FIG. 15 or a second beam profile image 85B to be measured by the second beam profiler 80B of the beam characteristic measuring device 80. The first beam profile image 85A may be an image of a beam cross-sectional shape of the laser light to be measured. The first beam profile image 85A may be formed on the first image sensor 83A by the first transfer optical system 82A. The second beam profile image 85B may be an image of a beam cross-sectional shape of the laser light to be measured. The second beam profile image 85B may be formed on the second image sensor 83B by the second transfer optical system 82B.

FIG. 16 schematically illustrates the beam profile image 85A or 85B, and a light intensity distribution in the X direction and a light intensity distribution in the Y direction of the beam profile image 85A or 85B. Here, a width (diameter) in the X direction of the concentrated beam of the laser light to be measured by the first beam profiler 80A may be defined as Bwx1. A width (diameter) in the X direction of the concentrated beam of the laser light to be measured by the second beam profiler 80B may be defined as Bwx2. In FIG. 16, Bwx may be a generic term for Bwx1 and Bwx2. Moreover, a width (diameter) in the Y direction of the concentrated beam of the laser light to be measured by the first beam profiler 80A may be defined as Bwy1. A width (diameter) in the Y direction of the concentrated beam of the laser light to be measured by the second beam profiler 80B may be defined as Bwy2. In FIG. 16, Bwy may be a generic term for Bwy1 and Bwy2.

In each of the first beam profiler 80A and the second beam profiler 80B, Bwx and Bwy may be determined as follows. The width (diameter) Bwx in the X direction of the concentrated beam of the laser light may be determined by Bwx=(X2−X1), where X1 and X2 are defined as X-direction coordinate positions at which light intensity is $1/e^2$ of the maximum value Ixmax of light intensity in the X direction. The width (diameter) Bwy in the Y direction of the concentrated beam of the laser light may be determined by Bwy=(Y2−Y1), where Y1 and Y2 are defined as Y-direction coordinate positions at which light intensity is $1/e^2$ of the maximum value Iymax of light intensity in the Y direction.

The beam spread angle θwx of the beam spread in the X direction over the distance L may be determined by the following expression (3).

$$\theta wx = (Bwx2 - Bwx1)(M/L) \tag{3}$$

The beam spread angle θwy of the beam spread in the Y direction over the distance L may be determined by the following expression (4).

$$\theta wy = (Bwy2 - Bwy1)(M/L) \tag{4}$$

The beam spread angles θwx and θwy in the X direction and the Y direction may be determined as described above.

The beam characteristic controller 84 may control the wavefront adjuster 70, based on a result detected by the beam characteristic measuring device 80 so that θwx=θwy is established.

Note that the widths (diameters) Bwx and Bwy of the concentrated beam of the laser light may be determined not only by the widths (diameters) on the basis of $1/e^2$ of the maximum values Ixmax and Iymax of light intensity, but also, for example, by coordinate positions at which light intensity is a certain percentage of the maximum values Ixmas and Iymax. The widths (diameters) Bwx and Bwy of the concentrated beam of the laser light may be determined, based on coordinate positions at which light intensity is 5% to 10% both inclusive of the maximum values Ixmax and Iymax.

8.2.3 Workings

According to the configuration example, beam divergence that is a parameter value of the concentrated beam of the laser light may be measured, based on the two beam profile images 85A and 85B formed on the two image sensors 83A and 83B.

8.3 Third Configuration Example

Example in which a Beam Profile is Measured with Use of a Wavefront Sensor 210

8.3.1 Configuration

Figure 17:
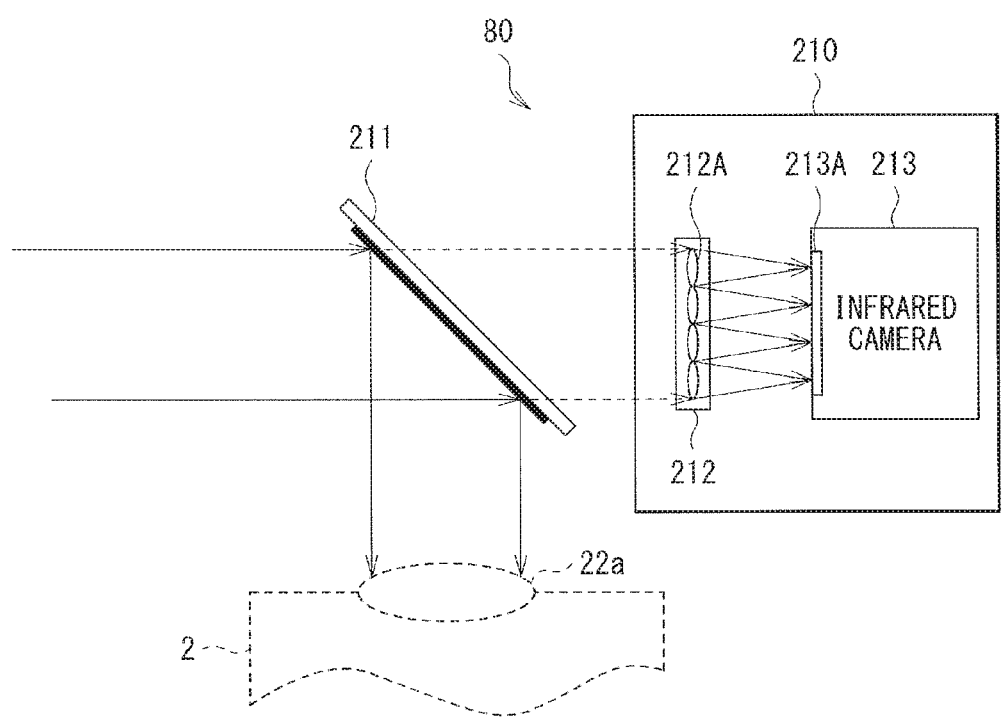
FIG. 17 schematically illustrates a configuration example of a beam characteristic measuring device that measures a beam profile by means of a wavefront sensor.

FIG. 17 schematically illustrates a configuration example of the beam characteristic measuring device 80 that measures a beam profile by means of a wavefront sensor 210. In FIG. 17, the wavefront sensor 210 may be a Shack-Hartmann sensor. The wavefront sensor 210 may include a microlens array 212 and an infrared camera 213. The microlens array 212 may include a large number of microlenses 212A. The infrared camera 213 may include an infrared image sensor 213A. A high reflection mirror 211 may be disposed in front of the wavefront sensor 210.

8.3.2 Operation and Workings

In the configuration example illustrated in FIG. 17, a majority of laser light may be reflected by the high reflection mirror 211. A minority of laser light that passes through the high reflection mirror 211 may enter the microlens array 212. An image at a focus point of each of the microlenses 212A may be measured by the infrared camera 213. The wavefront of the laser light may be measured by analysis of the position of the focus point of each of the microlenses 212A.

9. Sixth Embodiment

EUV Light Generating System Including a Pre-Pulsed Laser Unit 3P

9.1 Configuration

Figure 18:
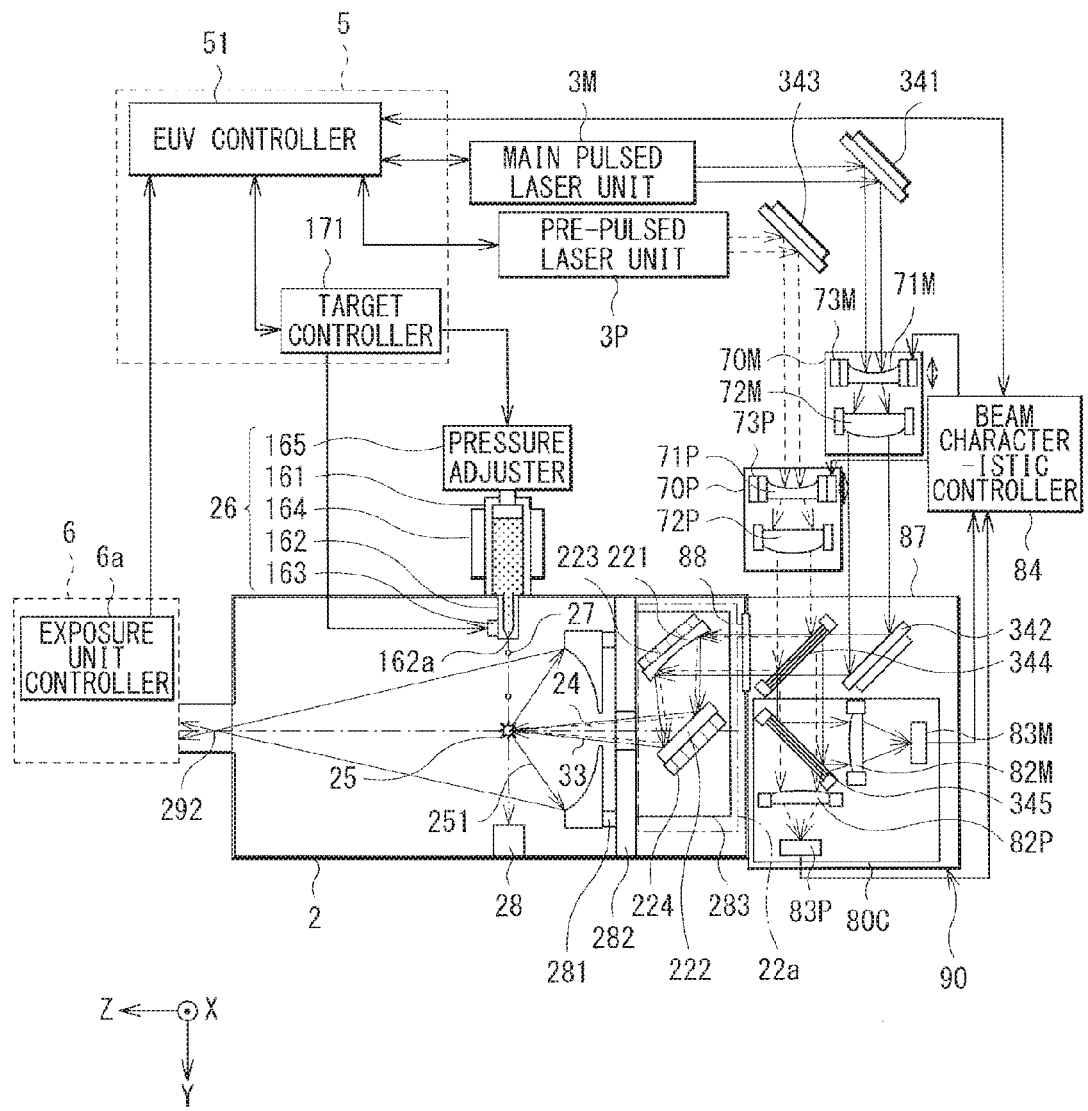
FIG. 18 schematically illustrates a configuration example of an EUV light generating system including a pre-pulsed laser unit.

FIG. 18 schematically illustrates a configuration example of an EUV light generating system including the pre-pulsed laser unit 3P. The EUV light generating system may include the chamber 2, the pre-pulsed laser unit 3P, a main pulsed laser unit 3M, and the EUV light generation controller 5. The EUV light generating system may further include a reflection mirror 341, a reflection mirror 343, a first wavefront adjuster 70P, a second wavefront adjuster 70M, the beam characteristic controller 84, and a beam combiner 90. The EUV light generation controller 5 may include an EUV controller 51 and a target controller 171.

The chamber 2 may include the laser concentrating optical system 22a and a plate 282. The chamber 2 may further include the EUV light concentrating mirror 23, a mirror holder 281, a window 88, and the target collector 28. The window 88 may be fixed to an inside wall of the chamber 2 by sealing. The chamber 2A may be attached with the target feeder 26.

The laser concentrating optical system 22a may include a plate 283, a holder 223, a holder 224, an off-axis parabolic mirror 221, and a plane mirror 222. The off-axis parabolic mirror 221 may be held to the plate 283 by the holder 223. The plane mirror 222 may be held to the plate 283 by the holder 224. The positions and the attitudes of the off-axis parabolic mirror 221 and the plane mirror 222 may be maintained so that the pulsed laser light 33 reflected by the off-axis parabolic mirror 221 and the plane mirror 222 is concentrated on the plasma generation region 25.

The plate 282 may be fixed to a wall inside the chamber 2. The EUV light concentrating mirror 23 may be a mirror including a spheroidal surface around the Z axis. The EUV light concentrating mirror 23 may be fixed to the plate 282 through the mirror holder 281 so that a first focal point of the spheroidal surface is substantially coincident with the plasma generation region 25. The through hole 24 through which the pulsed laser light 33 passes may be provided at a center part of the EUV light concentrating mirror 23.

The target feeder 26 may include a tank 161, a nozzle 162, a piezoelectric device 163, a heater 164, and a pressure adjuster 165. The target feeder 26 may be disposed to allow the target 27 outputted from the nozzle 162 to reach the plasma generation region 25 in a droplet form. The target collector 28 may be disposed on an extended line of a trajectory of the droplet target 27. The heater 164 may be provided at the tank 161. The tank 161 may store the target 27 that has been molten by the heater 164. The nozzle 162 may include a nozzle hole 62a through which the target 27 in the tank 161 is outputted. The piezoelectric device 163 may be disposed at the nozzle 162. The pressure adjuster 165 may adjust pressure in the tank 161.

The EUV light generating system may be demanded to generate the EUV light at a predetermined repetition frequency over a predetermined time period. The predetermined repetition frequency may be in a range from 50 kHz to 100 kHz both inclusive, for example. To allow the EUV light generating system to generate the EUV light at the predetermined repetition frequency, the target feeder 26 may output the target 27 at the predetermined repetition frequency. The pre-pulsed laser unit 3P and the main pulsed laser unit 3M may output the pulsed laser light in response to the feed timing of the target 27. A repetition frequency of the pulsed laser light outputted by the pre-pulsed laser unit 3P and the main pulsed laser unit 3M may be equivalent to the predetermined repetition frequency. Output of the pulsed light at the predetermined repetition frequency over the predetermined time period may be referred to as burst. Further, the pulsed light outputted through the burst may be referred to as a burst pulse.

A burst signal as a generation signal that instructs generation of the EUV light through the burst may be supplied to the EUV controller 51 from the exposure unit 6 as an external unit. The exposure unit 6 may include an exposure unit controller 6a. The burst signal may be supplied from the exposure unit controller 6a of the exposure unit 6.

The pre-pulsed laser unit 3P may be adapted to output pre-pulsed laser light, and may be a solid-state laser unit that includes a master oscillator including a Nd:YVO$_4$ crystal and one or more amplifiers. The main pulsed laser unit 3M may be adapted to output main pulsed laser light, and may be a CO$_2$ laser unit that includes a master oscillator and one or more amplifiers.

The beam combiner 90 may include a reflection mirror 342, a dichroic mirror 344, a plate 87, and a beam characteristic measuring device 80C.

The dichroic mirror 344 may be disposed in a light path between the reflection mirror 342 and the window 88. The dichroic mirror 344 may be so disposed as to allow a light path axis of the main pulsed laser light to be substantially coincident with a light path axis of the pre-pulsed laser light. The dichroic mirror 344 may be a diamond substrate including one surface that reflects, for example, pre-pulsed laser light with a wavelength of 1.06 μm at high reflectivity and allows part of the pre-pulsed laser light to pass therethrough. Alternatively, the dichroic mirror 344 may be coated with a film that allows, for example, main pulsed laser light of 10.6 μm to pass therethrough at high transmittance and reflects part of the main pulsed laser light. Another surface of the dichroic mirror 344 may be provided with a coating that reduces reflection of laser light with a wavelength of 1.06 and laser light with a wavelength of 10.6 μm.

The beam characteristic measuring device 80C may include a dichroic mirror 345, a light concentrating lens 82P, a light concentrating lens 82M, an image sensor 83P, and an image sensor 83M.

The beam characteristic measuring device 80C may be disposed so that the part of the pre-pulsed laser light having passed through the dichroic mirror 344 enters the beam characteristic measuring device 80C as laser light to be measured. Further, the beam characteristic measuring device 80C may be disposed so that the part of the main pulsed laser light reflected by the dichroic mirror 344 enters the beam characteristic measuring device 80C as laser light to be measured.

The dichroic mirror 345 may be disposed so that the pre-pulsed laser light and the main pulsed laser light enter the dichroic mirror 345 as the laser light to be measured. One surface of the dichroic mirror 345 may be coated with a film that allows, for example, pre-pulsed laser light with a wavelength of 1.06 μm to pass therethrough at high transmittance and reflects, for example, main pulsed laser light with a wavelength of 10.6 μm at high reflectivity. Another surface of the dichroic mirror 345 may be provided with a coating that reduces reflection of laser light with a wavelength of 1.06 μm and laser light with a wavelength of 10.6 μm.

The light concentrating lens 82P may be disposed so that the pre-pulsed laser light having passed through the dichroic mirror 345 enters the light concentrating lens 82P. The two-dimensional image sensor 83P may be disposed at a focal position of the light concentrating lens 82P. The light concentrating lens 82M may be disposed so that the main pulsed laser light reflected by the dichroic mirror 345 enters the light concentrating lens 82M. The two-dimensional image sensor 83P may be disposed at a focal position of the light concentrating lens 82P.

The first wavefront adjuster 70P may be disposed in a light path of the pre-pulsed laser light between the reflection mirror 343 and the dichroic mirror 344. The first wavefront adjuster 70P may include a cylindrical concave lens 71P, a cylindrical convex lens 72P, and a one-axis stage 73P. The cylindrical concave lens 71P may be disposed on the one-axis stage 73P with a holder in between so as to move along the light path axis of the pre-pulsed laser light.

The second wavefront adjuster 70M may be disposed in a light path of the main pulsed laser light between the reflection mirror 341 and the reflection mirror 342. The second wavefront adjuster 70M may include a cylindrical concave lens 71M, a cylindrical convex lens 72M, and a one-axis stage 73M. The cylindrical concave lens 71M may be disposed on the one-axis stage 73M with a holder in between so as to move along the light path axis of the main pulsed laser light.

The beam characteristic controller 84 may be a controller that controls the first wavefront adjuster 70P and the second wavefront adjuster 70M, based on a result of detection by the beam characteristic measuring device 80C. The beam characteristic controller 84 may be coupled to the image sensor 83P and the image sensor 83M through a signal line to receive data of the result of the detection by the beam characteristic measuring device 80C. The beam characteristic controller 84 may be coupled to the first wavefront adjuster 70P and the second wavefront adjuster 70M as well through a signal line to transmit a control signal to the first wavefront adjuster 70P and the second wavefront adjuster 70M. The control signal may be a signal that instructs varying of the position of the cylindrical concave lens 71P in the first wavefront adjuster 70P and the position of the cylindrical concave lens 71M in the second wavefront adjuster 70M. Further, the control signal may be a signal that controls a moving amount of the cylindrical concave lens 71P by the one-axis stage 73P and a moving amount of the cylindrical concave lens 71M by the one-axis stage 73M.

9.2 Operation

The EUV light generation controller 5 may output the control signal through the EUV controller 51 so as to cause the pre-pulsed laser unit 3P and the main pulsed laser unit 3M to oscillate in predetermined cycles. The pre-pulsed laser light outputted from the pre-pulsed laser unit 3P may be reflected by the reflection mirror 343 at high reflectivity, and may pass through the first wavefront adjuster 70P to enter the dichroic mirror 344. Part of the pre-pulsed laser light having passed through the dichroic mirror 344 may pass through the dichroic mirror 345 of the beam characteristic measuring device 80C at high transmittance to be concentrated by the light concentrating lens 82P. A beam profile at the focal position of the light concentrating lens 82P may be measured by the image sensor 83P. Here, the one-axis stage 73P of the first wavefront adjuster 70P may be controlled so that the concentrated beam of the pre-pulsed laser light measured by the image sensor 83P is formed close to a substantially circular shape.

Part of the main pulse laser light reflected by the dichroic mirror 344 may be reflected by the dichroic mirror 345 of the beam characteristic measuring device 80C at high reflectivity to be concentrated by the light concentrating lens 82M. A beam profile at the focal position of the light concentrating lens 82M may be measured by the image sensor 83M. The beam characteristic controller 84 may control the one-axis stage 73M of the second wavefront adjuster 70M so that the concentrated beam of the main pulsed laser light is formed close to a substantially circular shape.

The beam characteristic controller 84 may transmit an irradiation OK signal to the EUV controller 51 when the concentrated beam of the main pulsed laser light and the concentrated beam of the pre-pulsed laser light are formed in a substantially circular shape in a predetermined range. The irradiation OK signal may instruct irradiation of the target 27 with laser light.

Next, the EUV controller 51 may transmit a droplet generation signal to the target controller 171. When the target controller 171 receives the droplet generation signal from the EUV controller 51, the target controller 171 may perform temperature control to heat a material of the target 27 in the tank 161 to a predetermined temperature by the heater 164. For example, when the material of the target 27 is tin (Sn), the target controller 171 may perform the temperature control to heat the material to a predetermined temperature of about 232° C. as the melting point of tin or higher. For example, the target controller 171 may perform the temperature control to heat the material to a predetermined temperature in a range from 230° C. to 280° C. both inclusive. The target controller 171 may control the pressure adjuster 65 so that the pressure in the tank 161 becomes pressure at which a jet that eventually serves as the target 27 is outputted at a predetermined speed from the nozzle hole 162a of the nozzle 162. The target controller 171 may then supply a voltage with a predetermined waveform to the piezoelectric device 163 so as to generate the droplet target 27. The jet outputted from the nozzle hole 162a may be oscillated by the piezoelectric device 163, and a standing wave may occur on a jet surface. As a result, the jet may be divided into the droplet targets 27. The droplet target 27 may be generated in such a way by a continuous jet (CJ) method. For example, the droplet target 27 may be generated at a predetermined frequency in a range from 50 kHz to 100 kHz both inclusive.

When the predetermined droplet is generated, the EUV controller 51 may transmit a light emission trigger to the pre-pulsed laser unit 3P at timing that the droplet reaches the plasma generation region 25 so as to apply the pre-pulsed laser light to the droplet. When the pre-pulsed laser light is applied to the droplet, the target 27 may be broken to be spread, and a plurality of minute droplets may be diffused to generate the secondary target 27. The light emission trigger may be transmitted to the main pulse laser unit 3M so as to apply the main pulsed laser light to the secondary target 27.

As a result, for example, a beam shape of the pre-pulsed laser light applied to a spherical droplet with a diameter of about 10 μm to about 30 μm both inclusive may be, for example, a substantially circular shape with a diameter of 30 μm to 70 μm both inclusive. The droplet may be then broken and spread to produce a diffusion of a plurality of minute droplets, following which the secondary target 27 with a substantially circular cross-sectional shape that is perpendicular to the light path axis may be generated. The diameter of the substantially circular secondary target 27 may be, for example, from about 300 μm to about 400 μm both inclusive. The substantially circular secondary target 27 may be irradiated with the main pulsed laser light with a substantially circular shape that is substantially coincident with the shape of the secondary target 27. The secondary droplet target 27 may be irradiated with the main pulsed laser light to turn into plasma, and the EUV light 251 is generated from the plasma.

Figure 19:
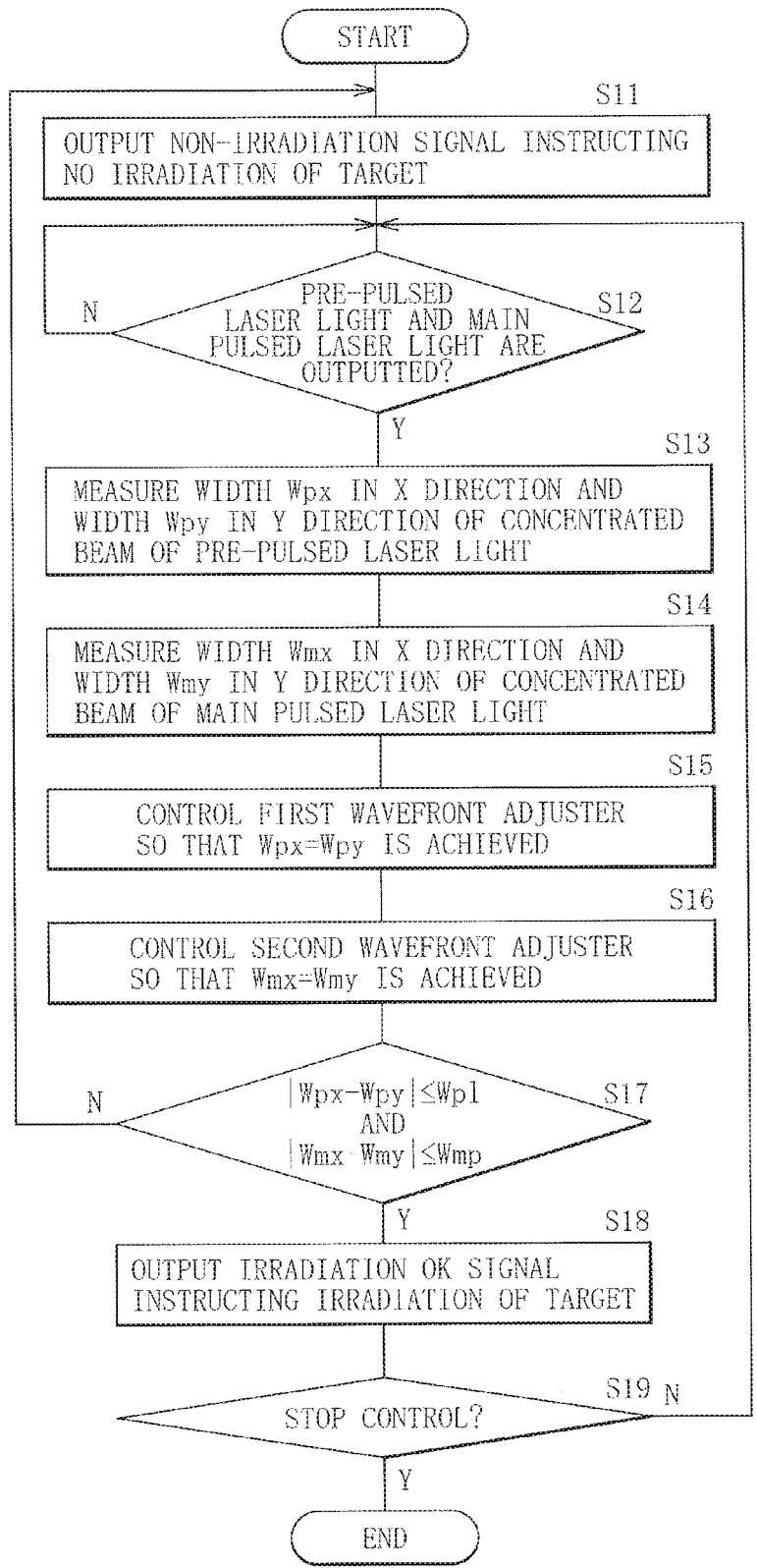
FIG. 19 schematically illustrates an example of a flow of control of laser light in the EUV light generating system illustrated in FIG. 18.

Next, with reference to FIG. 19, description is given of control operation until the irradiation OK signal is transmitted in the EUV light generating system illustrated in FIG. 18. The irradiation OK signal may instruct irradiation of the target 27 with laser light.

As an initial state, the beam characteristic controller 84 may transmit a non-irradiation signal to the EUV controller 51 (step S11). The non-irradiation signal may instruct no irradiation of the target 27 with laser light. Thereafter, the beam characteristic controller 84 may determine whether the pre-pulsed laser light and the main pulsed laser light are outputted (step S12). In a case where the pre-pulsed laser light and the main pulsed laser light are not outputted (step S12; N), the beam characteristic controller 84 may repeat a process in the step S12. In a case where the pre-pulsed laser light and the main pulsed laser light are outputted (step S12; Y), the beam characteristic controller 84 may proceed to a process in step S13. The beam characteristic controller 84 may measure, as the process in the step S13, the width (diameter) Wpx in the X direction and the width (diameter) Wpy in the Y direction of the concentrated beam of the pre-pulsed laser light with use of the beam characteristic measuring device 80C. The measurement of the widths (diameters) Wpx and Wpy may be performed, based on data of a beam profile image acquired by the image sensor 83P, by a method similar to the above-described method illustrated in FIG. 14. The beam characteristic controller 84 may measure the width (diameter) Wmx in the X direction and the width (diameter) Wmy in the Y direction of the concentrated beam of the main pulsed laser light as well with use of the beam characteristic measuring device 80C (step S14). The measurement of the widths (diameters) Wmx and Wmy may be performed, based on data of a beam profile image acquired by the image sensor 83M by a method similar to the above-described method illustrated in FIG. 14.

Next, the beam characteristic controller 84 may control the first wavefront adjuster 70P so that the widths (diameters) Wpx and Wpy approach Wpx=Wpy (step S15). Moreover, the beam characteristic controller 84 may control the second wavefront adjuster 70M so that the widths (diameters) Wmx and Wmy approach Wmx=Wmy (step S16).

The beam characteristic controller 84 may then determine whether the following conditions are satisfied (step S17). The processes in the steps S11 to S16 may be repeated until the conditions are satisfied (step S17; N).

$|Wpx-Wpy| \leq Wpl$, and $|Wpx-Wpy| \leq Wpl$, and

Here, Wpl may be defined as an allowable value of an absolute value of a difference between Wpx and Wpy, and may be, for example, from 2 μm to 5 μm both inclusive. Wmp may be defined as an allowable value of an absolute value of a difference between Wmx and Wmy, and may be, for example, from 10 μm to 40 μm both inclusive.

In a case where the above-described conditions are not satisfied (step S17; N), the beam characteristic controller 84 may return to a process in the step S11. In a case where the above-described conditions are satisfied (step S17; Y), the beam characteristic controller 84 may transmit the irradiation OK signal to the EUV controller 51 (step S18). The irradiation OK signal may instruct irradiation of the target 27 with laser light. In a case where the control is to be continued (step S19; N), the beam characteristic controller 84 may repeat the processes in the steps S12 to S18. In a case where the control is to be discontinued (step S19; Y), the beam characteristic controller 84 may stop the control.

9.3 Workings

According to the sixth embodiment, it is possible to irradiate the spherical droplet with the concentrated beam of substantially circular pre-pulsed laser light. The substantially circular secondary target 27 may be therefore generated stably. For example, it is possible to irradiate the substantially circular secondary target 27 with a diameter of about 300 μm to about 400 μm both inclusive with a concentrated beam of the substantially circular main pulsed light with a diameter substantially equal to the diameter of the secondary target 27. This may make it possible to improve conversion efficiency CE into the EUV light 251.

9.4 Modification Example

In the configuration example in FIG. 18, the beam characteristic measuring device 80C is disposed at a position of the beam combiner 90, but the configuration is not limited to this example. For example, a concave mirror that transfers a beam concentrated by an actual laser concentrating optical system and forms an image of the beam may be disposed in a light path after concentration of laser light. An image at a focus point that is formed on an image sensor by the above-described concave mirror may be measured.

10. Seventh Embodiment

Laser Unit Including a Rotary Mechanism of a Wavefront Adjuster 70

10.1 Configuration

Figure 20:
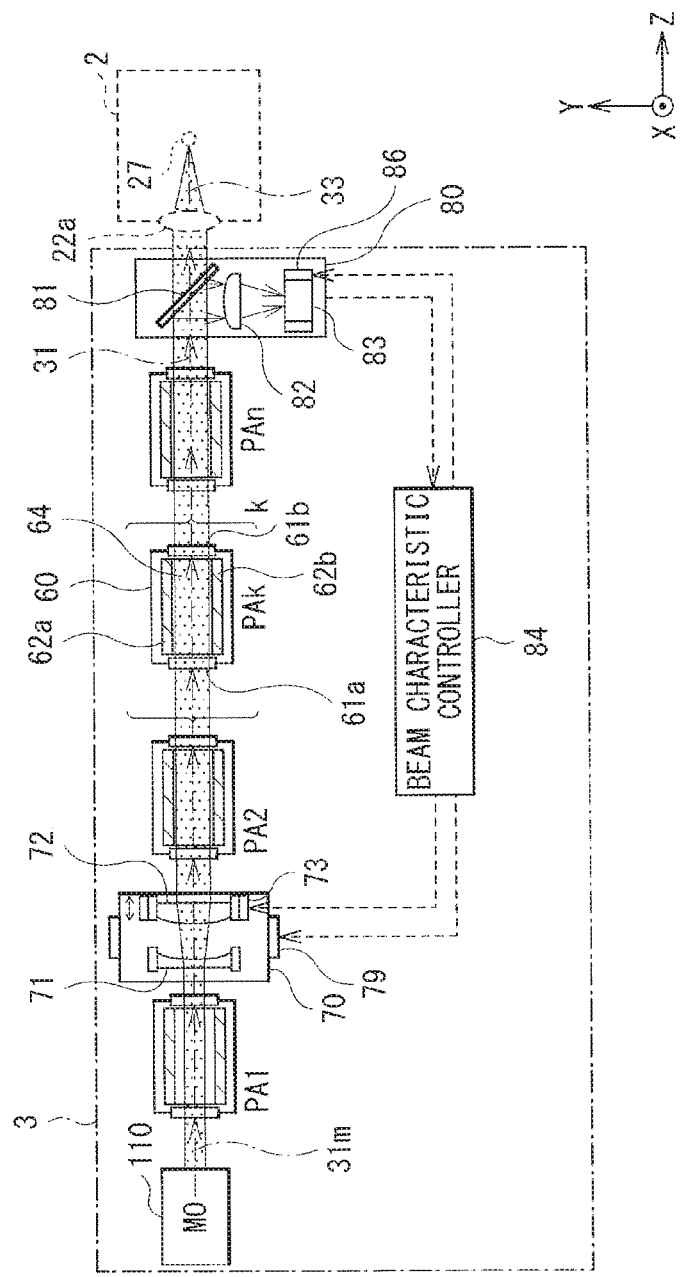
FIG. 20 schematically illustrates a configuration example of a laser unit including a rotary mechanism of a wavefront adjuster.

FIG. 20 schematically illustrates a configuration example of the laser unit 3 including a rotary mechanism of the wavefront adjuster 70 according to a seventh embodiment of the disclosure. The laser unit 3 illustrated in FIG. 20 may include the beam characteristic measuring device 80 combined with a one-axis stage 86. The one-axis stage 86 may be disposed so as to allow the image sensor 83 to move around the focal point of the light concentrating lens 82 along the traveling direction of the laser light. Further, the laser unit 3 illustrated in FIG. 20 may further include the wavefront adjuster 70 combined with a rotary stage 79. The rotary stage 79 may rotate around the light path axis. The one-axis stage 86 and the rotary stage 79 may be controlled by the beam characteristic controller 84.

Note that the configuration of the laser unit 3 according to the seventh embodiment is substantially similar to the configuration of the laser unit 3 illustrated in FIG. 6, except for the one-axis stage 86, the rotary stage 79, and the beam characteristic controller 84 that controls the one-axis stage 86 and the rotary stage 79.

10.2 Operation

Figure 21:
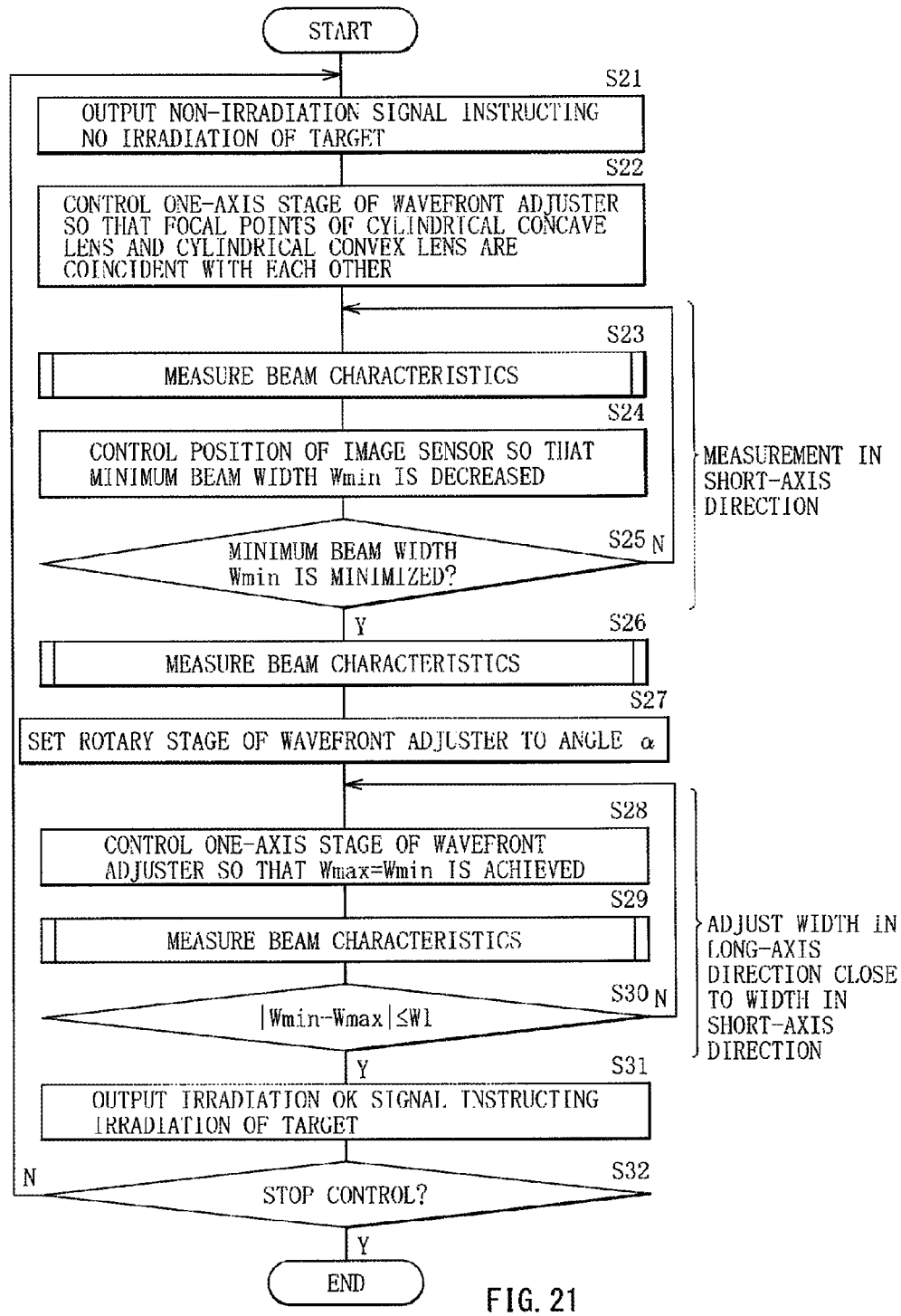
FIG. 21 schematically illustrates an example of a flow of control of laser light in the laser unit illustrated in FIG. 20.
Figure 22:
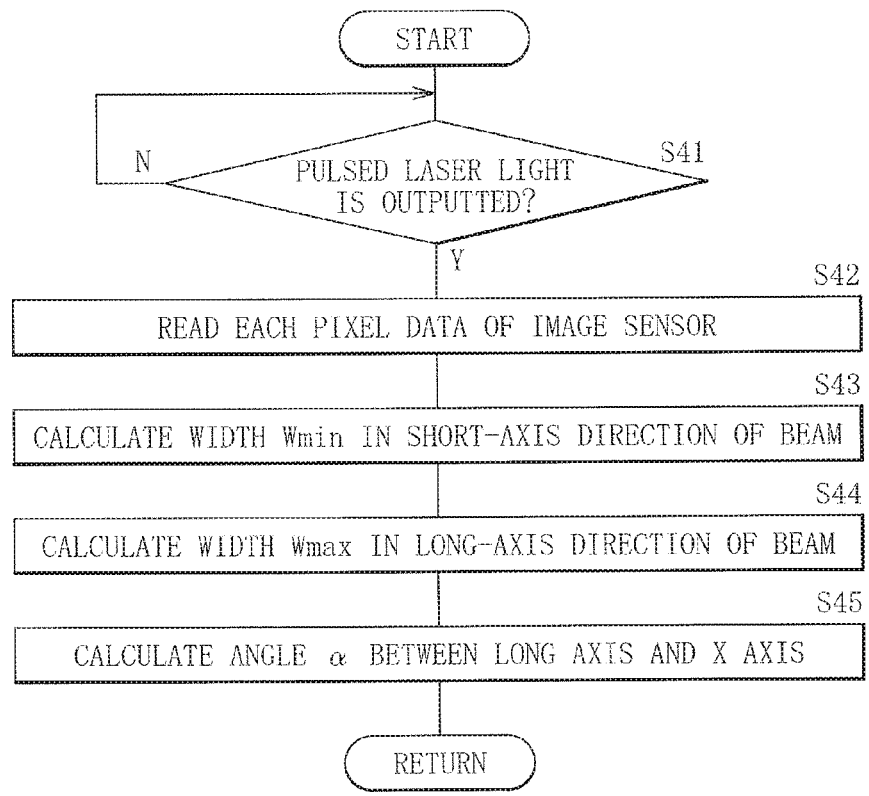
FIG. 22 schematically illustrates an example of a flow of beam characteristic measurement in the laser unit illustrated in FIG. 20.

FIG. 21 schematically illustrates an example of a flow of control of the laser light in the laser unit illustrated in FIG. 20. FIG. 22 schematically illustrates an example of a flow of beam characteristic measurement (steps S23, S26, and S29) in the laser unit illustrated in FIG. 20. FIG. 23 schematically illustrates an example of the beam profile image 85 to be measured in the laser unit illustrated in FIG. 20.

As an initial state, the beam characteristic controller 84 may transmit a non-irradiation signal (step S21). The non-irradiation signal may instruct no irradiation of the target 27 with laser light. The beam characteristic controller 84 may control the one-axis stage 73, and may initialize the position of the cylindrical convex lens 72 so that the focal points of the cylindrical concave lens 71 and the cylindrical convex lens 72 of the wavefront adjuster 70 are coincident with each other (step S22).

When the laser light is detected, the beam characteristic controller 84 may perform the following step. The beam characteristic controller 84 may measure a beam shape and beam characteristics of the laser light concentrated by the light concentrating lens 82 (step S23).

The beam characteristic measurement may include the following processes as illustrated in FIG. 22. The beam characteristic controller 84 may determine whether the pulsed laser light is outputted (step S41). In a case where the pulsed laser light is not outputted (step S41; N), the beam characteristic controller 84 may repeat the step S41. In a case where the pulsed laser light is outputted (step S41; Y), the beam characteristic controller 84 may read each pixel data of the beam profile image 85 as illustrated in FIG. 23 acquired by the image sensor 83 (step S42). Next, a beam width (diameter) in a short-axis direction may be measured as a minimum beam width Wmin, as illustrated in FIG. 23 (step S43). Moreover, a beam width (diameter) in a long-axis direction may be measured as a maximum beam width Wmax (step S44). Further, an angle α between the long-axis direction and the X direction may be calculated (step S45).

Next, the beam characteristic controller 84 may control the position of the image sensor 83 with use of the one-axis stage 86 so that the minimum beam width Wmin of a beam in one direction is decreased (step S24). The beam characteristic controller 84 may then measure, from data of the image sensor 83, the minimum beam width Wmin in a direction in which the beam width (diameter) is minimized, and may determine whether the minimum beam width Wmin is minimized (step S25). The processes in the step S23 and S24 may be repeated until the beam width (diameter) is minimized (step S25; N).

In a case where the beam characteristic controller 84 determines that the minimum beam width Wmin is minimized (step S25; Y), the beam characteristic controller 84 may then proceed to a process in step S26. As the process in the step S26, the beam characteristic controller 84 may measure, from the data of the image sensor 83, the direction of the angle α at which the beam width is maximized and the maximum beam width Wmax in a direction in which the beam width is maximized. Next, the beam characteristic controller 84 may control the rotary stage 79 of the wavefront adjuster 70 so that a direction in which the wavefront curvature is varied forms the angle α (step S27). Next, the beam characteristic controller 84 may measure, from the data of the image sensor 83, the maximum beam width Wmax in the direction of the angle α, and may control the one-axis stage 73 of the wavefront adjuster 70 so that the maximum beam width Wmax approaches Wmax=Wmin (step S28). Alternatively, the beam characteristic controller 84 may measure, from the data of the image sensor 83, the maximum beam width Wmax in the direction of the angle α, and may control the one-axis stage 73 of the wavefront adjuster 70 so that the maximum beam width Wmax is minimized.

Next, the beam characteristic controller 84 may measure the beam characteristics, and may determine whether the following condition is satisfied (step S30). The processes in the steps S28 and S29 may be repeated until the condition is satisfied (step S30; N). Here, W1 may be defined as an allowable value of an absolute value of a difference between Wmin and Wmax.

$|Wmin-Wmax| \leq W1$

In a case where the above-described condition is satisfied (step S30; Y), the beam characteristic controller 84 may transmit the irradiation OK signal that instructs irradiation of the target 27 with laser light (step S31). In a case where the control is to be continued (step S32; N), the beam characteristic controller 84 may repeat the processes in the steps S21 to S31. In a case where the control is to be discontinued (step S32; Y), the beam characteristic controller 84 may stop the processes.

10.3 Workings

According to the seventh embodiment, irrespective of the long-axis direction and the short-axis direction of the beam profile of the concentrated beam of the laser light, an adjustment direction of the beam diameter by the wavefront adjuster 70 may be rotated around the light path axis so as to be coincident with the long-axis direction. This may allow the positions of beam waists in two directions orthogonal to each other to be substantially coincident with each other.

Others

Although an example in which the position of the image sensor 83 is controlled is described above, the position of the light concentrating lens 82 may be moved along the direction of the light path axis.

10.4 Modification Examples

10.4.1 First Modification Example

Laser Unit Including a Rotary Mechanism that Rotates a Cylindrical Mirror

FIG. 24 schematically illustrates an example, as viewed in the X direction, of a rotary mechanism that rotates the wavefront adjuster 70B that uses a cylindrical mirror. FIG. 25 schematically illustrates an example, as viewed in the Z direction, of the rotary mechanism that rotates the wavefront adjuster 70B that uses the cylindrical mirror.

FIG. 20 illustrates the configuration example in which the rotary mechanism is provided on the wavefront adjuster 70 that uses the cylindrical lens. Alternatively, for example, a rotary mechanism may be added to the wavefront adjuster 70B that uses a cylindrical mirror, as illustrated in FIGS. 24 and 25. The configuration of the wavefront adjuster 70B that uses the cylindrical mirror may be substantially similar to the wavefront adjuster 70B illustrated in FIG. 11, except for the rotary mechanism. The rotary stage 120 may be a goniometer stage. The rotary stage 120 may include a fixed stage 121 and a movable section 122. The movable section 122 may be driven by a pulse motor 123. A driving amount by the pulse motor 123 may be controlled by the beam characteristic controller 84. A light path axis of a laser may be substantially coincident with a rotation central axis 125 of the rotary stage 120. In a case where weight balance with respect to the rotation central axis 125 is not favorable, a counter weight 124 may be provided on side opposite to other optical devices.

10.4.2 Second Modification Example

Figure 26:
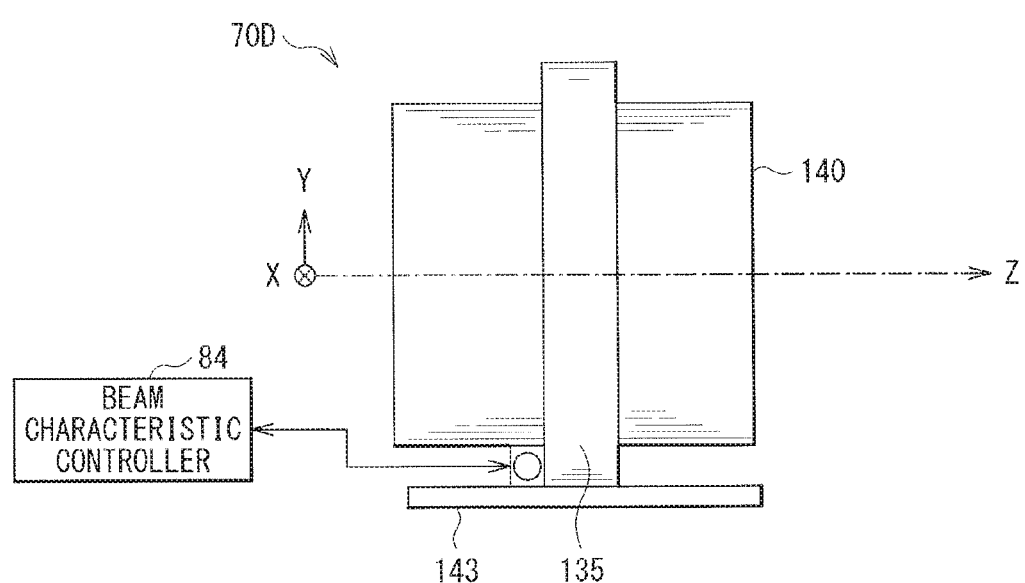
FIG. 26 schematically illustrates an example of an appearance of a wavefront adjuster according to a second modification example of the laser unit illustrated in FIG. 20.
Figure 27:
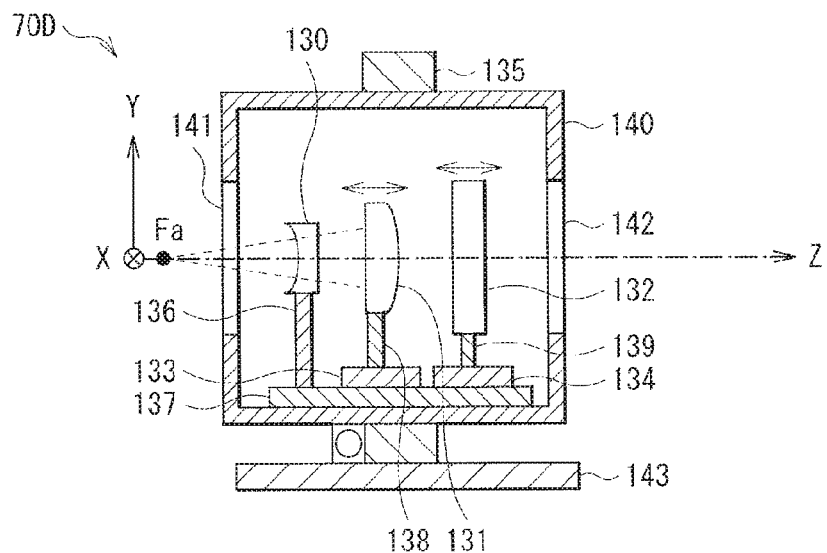
FIG. 27 schematically illustrates a cross-sectional configuration of the wavefront adjuster illustrated in FIG. 26, as viewed in the X direction.
Figure 28:
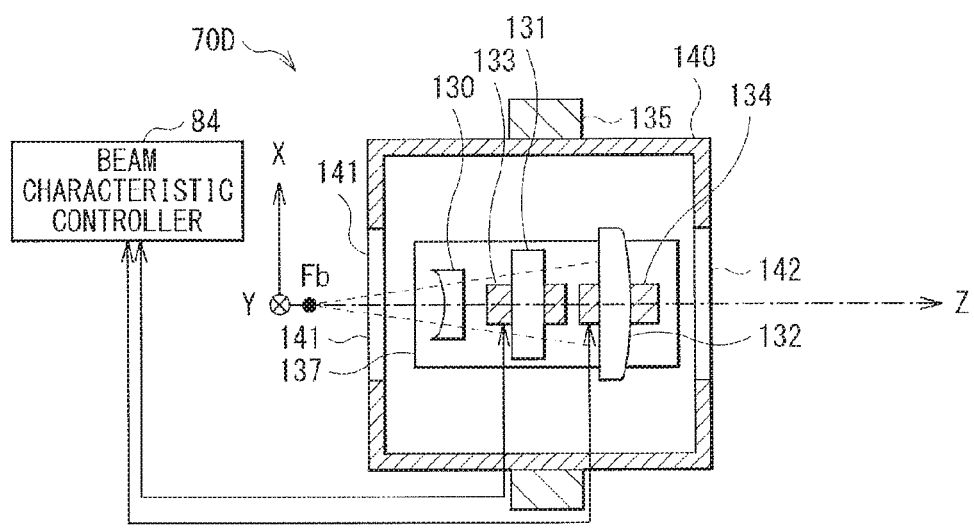
FIG. 28 schematically illustrates a cross-sectional configuration of the wavefront adjuster illustrated in FIG. 26, as viewed in the Y direction.

Wavefront Adjuster Including a Toroidal Lens and First and Second Cylindrical Lenses Configuration FIGS. 26 to 28 illustrate a configuration example of a wavefront adjuster 70D according to a second modification example of the laser unit 3 illustrated in FIG. 20. FIG. 26 schematically illustrates an example of an appearance of the wavefront adjuster 70D. FIG. 27 schematically illustrates an example of a cross-sectional configuration of the wavefront adjuster 70D, as viewed in the X direction. FIG. 28 schematically illustrates an example of a cross-sectional configuration of the wavefront adjuster 70D, as viewed in the Y direction.

Note that the configuration of the laser unit 3 according to the second modification example may be substantially similar to the configuration of the laser unit 3 illustrated in FIG. 20, except for the wavefront adjuster 70D.

The wavefront adjuster 70D may include a base 143, a main body 140, and a rotary stage 135. The main body 140 and the rotary stage 135 may be disposed on the base 143. The main body 140 may be provided with an entrance port 141 and an exit port 142 of laser light.

A toroidal lens 130, a first cylindrical lens 131, a second cylindrical lens 132, a first one-axis stage 133, and a second one-axis stage 134 may be provided inside the main body 140.

The toroidal lens 130 may be disposed on a base plate 137 with a post 136 and any other component in between. The toroidal lens 130 may be adapted to correct astigmatism of laser light entering from a direction of the light path axis (minus Z-axis direction). Accordingly, the toroidal lens 130 may be an optical device with different curvatures in the X direction and in the Y direction in FIGS. 27 and 28.

The first cylindrical lens 131 may be disposed on the first one-axis stage 133 with a post 138 and any other component in between. Likewise, the second cylindrical lens 132 may be disposed on the second one-axis stage 134 with a post 139 and any other component in between.

The first cylindrical lens 131 and the second cylindrical lens 132 may be disposed so that cylindrical surfaces thereof are orthogonal to each other. Moreover, curvatures of the first cylindrical lens 131 and the second cylindrical lens 132 may be so provided as to allow the focal points of the first cylindrical lens 131 and the second cylindrical lens 132 to be coincident with a focal point of the toroidal lens 130. More specifically, the focal points of the toroidal lens 130 and the first cylindrical lens 131 may be coincident with a position Fa in an YZ cross-section, as illustrated in FIG. 27. Moreover, the focal points of the toroidal lens 130 and the second cylindrical lens 132 may be coincident with a position Fb in an XZ cross-section, as illustrated in FIG. 28. Accordingly, the curvatures of the first cylindrical lens 131 and the second cylindrical lens 132 may be different from each other.

The first one-axis stage 133 and the second one-axis stage 134 may be fixed to the base plate 137. The first one-axis stage 133 may allow the first cylindrical lens 131 to be movable along the direction of the light path axis on the base plate 137. The second one-axis stage 134 may allow the second cylindrical lens 132 to be movable along the direction of the light path axis on the base plate 137.

The rotary stage 135 may be configured to rotate the base plate 137 around the Z axis in the figure. The Z axis may be the light path axis. The first one-axis stage 133, the second one-axis stage 134, and the rotary stage 135 may be coupled to the beam characteristic controller 84, and operation of the first one-axis stage 133, the second one-axis stage 134, and the rotary stage 135 may be controlled by the beam characteristic controller 84. Moreover, each of the first one-axis stage 133, the second one-axis stage 134, and the rotary stage 135 may include an encoder.

Operation

Figure 29A:
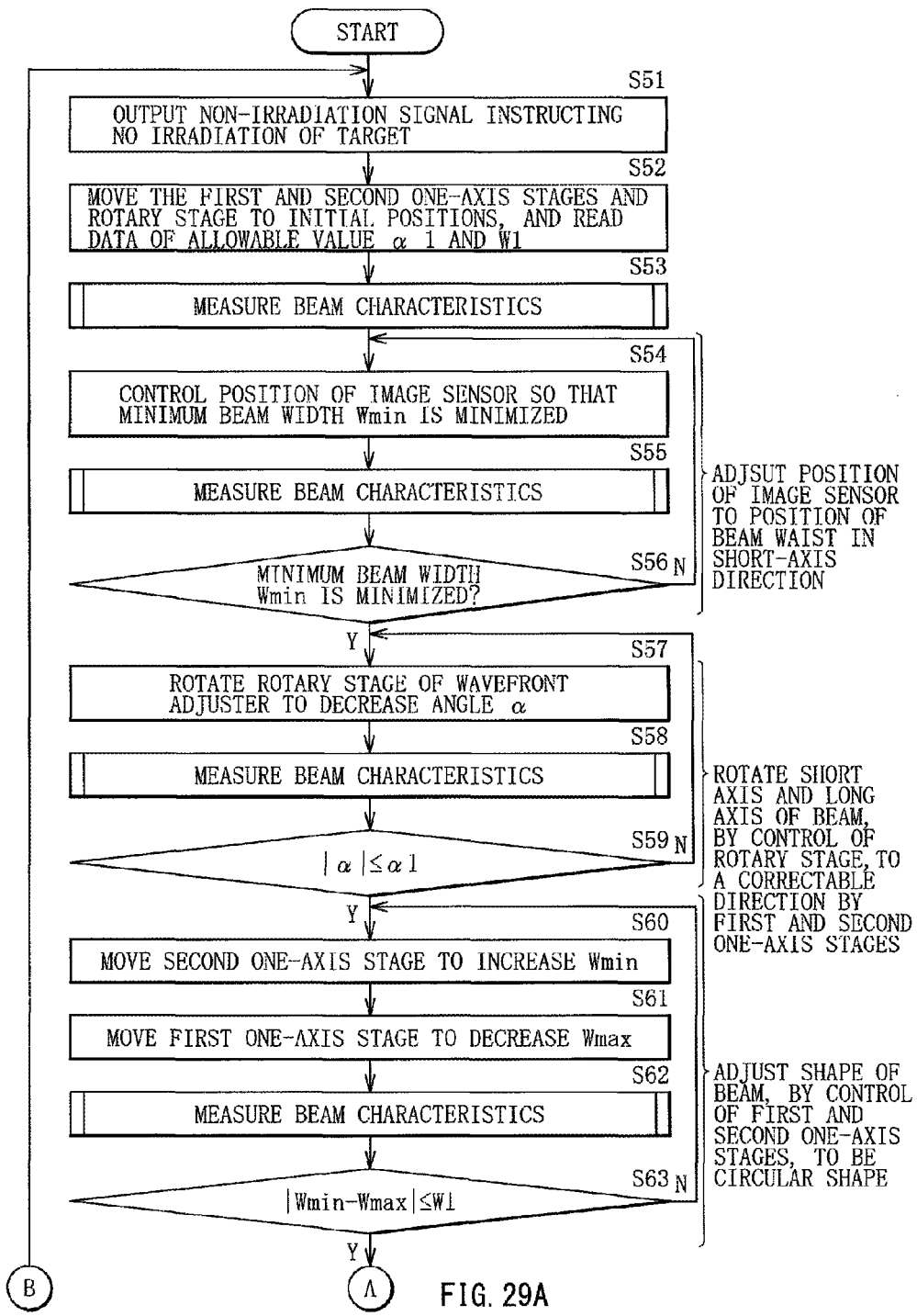
FIG. 29A schematically illustrates an example of a flow of control of laser light with use of the wavefront adjuster illustrated in FIGS. 26 to 28.
Figure 29B:
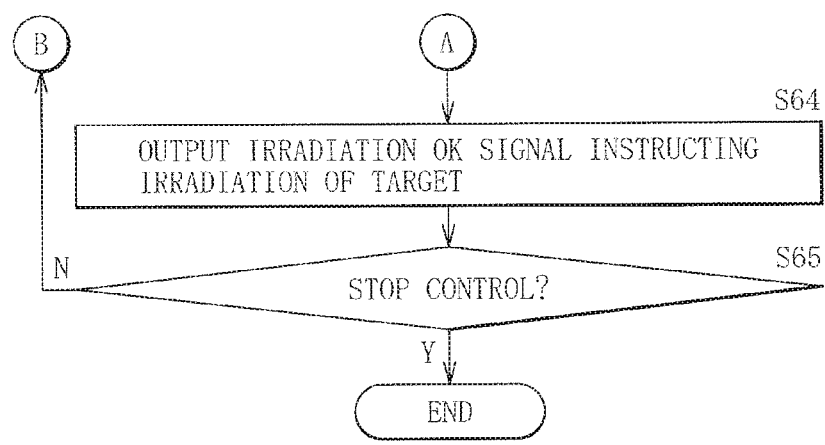
FIG. 29B schematically illustrates an example of a flow of control following FIG. 29A.

FIGS. 29A and 29B schematically illustrate an example of a flow of control of the laser light in a case where the wavefront adjuster 70D according to the modification example is used. Note that processes of beam characteristic measurement in FIG. 29A (steps S53, S55, S58, and S62) may be substantially similar to the processes in FIG. 22 mentioned above. Moreover, the beam profile image 85 to be measured may be substantially similar to the beam profile image 85 in FIG. 23 mentioned above.

As an initial state, the beam characteristic controller 84 may transmit a non-irradiation signal that instructs no irradiation of the target 27 with laser light (step S51). The beam characteristic controller 84 may then move the first one-axis stage 133, the second one-axis stage 134, and the rotary stage 135 to predetermined corresponding initial positions as an initializing process (step S52). Moreover, at this occasion, the beam characteristic controller 84 may read data of a predetermined allowable value α1 of an angle and a predetermined allowable value W1 of a beam width from an unillustrated storage section.

Next, the beam characteristic controller 84 may perform the following step when laser light is detected. The beam characteristic controller 84 may measure a beam shape and beam characteristics of the laser light concentrated by the light concentrating lens 82 (step S53).

The beam characteristic measurement may include the processes illustrated in FIG. 22 mentioned above. The beam characteristic measurement process may include a process of measuring the minimum beam width Wmin, the maximum beam width Wmax, and the angle α between the long-axis direction and the X direction, as illustrated in FIG. 23 mentioned above.

Next, the beam characteristic controller 84 may control the position of the image sensor 83 with use of the one-axis stage 86 so that the minimum beam width Wmin of a beam in one direction is decreased (step S54). The beam characteristic controller 84 may then measure the beam characteristics (step S55). Thus, the beam characteristic controller 84 may determine whether the minimum beam width Wmin is minimized (step S56). The beam characteristic controller 84 may repeat the processes in the steps S54 and S55 until the minimum beam width Wmin is minimized (step S56; N). Accordingly, the position of the image sensor 83 may be adjusted to a position of a beam waist in the short-axis direction.

In a case where the beam characteristic controller 84 determines that the minimum beam width Wmin is minimized (step S56; Y), the rotary stage 135 of the wavefront adjuster 70D may be so rotated as to decrease the angle α (step S57). The beam characteristic controller 84 may then measure the beam characteristics (step S58), and may determine whether the angle α satisfies a condition of $|\alpha| \leq |\alpha 1|$ (step S59). The processes S57 and S58 may be repeated until the condition is satisfied (step S59; N). Accordingly, the short axis and the long axis of the beam may be rotated to a direction in which the short axis and the long axis of the beam are correctable by the first one-axis stage 133 and the second one-axis stage 134.

In a case where the beam characteristic controller 84 determines that the above-described condition of the angle α is satisfied (step S59; Y), the second one-axis stage 134 of the wavefront adjuster 70D may be so moved as to increase the minimum beam width Wmin (step S60). Next, the beam characteristic controller 84 may so move the first one-axis stage 133 of the wavefront adjuster 70D as to decrease the maximum beam width Wmax (step S61).

Next, the beam characteristic controller 84 may measure the beam characteristics (step S62), and may determine whether the beam width satisfies a condition of |Wmin−Wmax|≤W1 (step S63). The processes in the steps S60 to S62 may be repeated until the condition is satisfied (step S63; N). Here, W1 may be defined as an allowable value of an absolute value of a difference between Wmin and Wmax. Accordingly, the cross-sectional shape of the beam may approach a circular shape.

In a case where the beam characteristic controller 84 determines that the above-described condition of the beam width is satisfied (step S63; Y), the beam characteristic controller 84 may transmit the irradiation OK signal that instructs irradiation of the target 27 with laser light (step S64). In a case where the control is to be continued (step S65; N), the beam characteristic controller 84 may repeat the processes in the steps S51 to S64. In a case where the control is to be discontinued (step S65; Y), the beam characteristic controller 84 may stop the processes.

Workings

According to the second modification example described above, the wavefront adjuster 70D includes the rotary stage 135. This may make it possible to adjust the long axis and the short axis, even when the beam profile is inclined in any direction. Moreover, the first cylindrical lens 131 and the second cylindrical lens 132 are configured to be independently movable along the direction of the light path axis. This may make it possible to independently adjust divergences in two directions orthogonal to each other. Accordingly, irrespective of the beam profile of entering laser light, a beam profile close to a perfect circle may be achieved. Further, the beam size may be adjusted in the profile close to a perfect circle.

Other Configuration

In addition to the configurations described above, the toroidal lens 130, the first cylindrical lens 131, and the second cylindrical lens 132 in the wavefront adjuster 70D may be replaced by mirrors, for example.

11. Variations of Laser Amplifier 11.1 Triaxial Orthogonal Amplifier

In the laser units according to the foregoing embodiments, a triaxial orthogonal amplifier illustrated in FIGS. 30 and 31 may be used as the laser amplifier. FIG. 31 illustrates a cross-sectional configuration example, taken along a line Z1-Z1' of FIG. 30, of the triaxial orthogonal amplifier illustrated in FIG. 30.

The triaxial orthogonal amplifier may include a laser chamber 180, an input window 181a, an output window 181b, a pair of electrodes 182a and 182b, a cross flow fan 186, and an RF power supply 65. The triaxial orthogonal amplifier may further include a heat exchanger 189. Each of a motor 187 and a bearing 188 may be coupled to corresponding one of ends of the cross flow fan 186.

The laser chamber 180 may contain a $CO_2$ laser gas as a laser medium. The pair of electrodes 182a and 182b and the RF power supply 65 may configure an excitation unit that excites the laser medium to amplify seed light having entered the inside of the laser chamber 180. The pair of electrodes 182a and 182b may be provided inside the laser chamber 180 and may excite the laser medium by electric discharge in a discharge region 184. An electrode interval between the pair of electrodes 182a and 182b may be, for example, 10 mm to 60 mm both inclusive. The RF power supply 65 may supply an RF voltage to the pair of electrodes 182*a* and 182*b*.

In the triaxial orthogonal amplifier, the cross flow fan 186 may circulate laser gas G1 to supply the laser gas G1 between the pair of electrodes 182*a* and 182*b*. While supplying the RF voltage from the RF power supply 65 to the pair of electrodes 182*a* and 182*b*, laser light that eventually serves as seed light may enter the inside of the laser chamber 180 through the input window 181*a*. The entered seed light may pass through the laser medium excited between the pair of electrodes 182*a* and 182*b* to be subjected to amplification. The thus-amplified seed light may be outputted from the output window 181*b* as amplified laser light.

11.2 Fast-Axial Flow Laser Amplifier

In the laser units according to the foregoing embodiments, a fast-axial flow laser amplifier illustrated in FIG. 32 may be used as the laser amplifier. The fast-axial flow laser amplifier may include an RF power supply 65, a discharge tube 190, an input window 191*a*, an output window 191*b*, a pair of electrodes 192*a* and 192*b*, a blower 196, and a heat exchanger 199.

The discharge tube 190 may contain $CO_2$ laser gas as a laser medium. The pair of electrodes 192*a* and 192*b* and the RF power supply 65 may configure an excitation unit that excites the laser medium to amplify seed light having entered the inside of the discharge tube 190. The pair of electrodes 192*a* and 192*b* may be provided on the periphery of the discharge tube 190 and may excite the laser medium by electric discharge in the discharge tube 190. The RF power supply 65 may supply an RF voltage to the pair of electrodes 192*a* and 192*b*.

In the fast-axial flow laser amplifier, the blower 196 may circulate laser gas G1 to supply the laser gas G1 to the inside of the discharge tube 190. While supplying the RF voltage from the RF power supply 65 to the pair of electrodes 192*a* and 192*b*, laser light to serve as seed light may enter the inside of the discharge tube 190 through the input window 191*a*. The entered seed light may pass through the laser medium excited by the pair of electrodes 192*a* and 192*b* to be subjected to amplification. The thus-amplified seed light may be outputted from the output window 191*b* as amplified laser light.

12. Hardware Environment of Controller

A person skilled in the art will appreciate that a general-purpose computer or a programmable controller may be combined with a program module or a software application to execute any subject matter disclosed herein. The program module, in general, may include one or more of a routine, a program, a component, a data structure, and so forth that each causes any process described in any embodiment of the disclosure to be executed.

FIG. 33 is a block diagram illustrating exemplary hardware environment in which various aspects of any subject matter disclosed therein may be executed. An exemplary hardware environment 100 in FIG. 33 may include a processing unit 1000, a storage unit 1005, a user interface 1010, a parallel input/output (I/O) controller 1020, a serial I/O controller 1030, and an analog-to-digital (A/D) and digital-to-analog (D/A) converter 1040. Note that the configuration of the hardware environment is not limited thereto.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any commercially-available processor. A dual microprocessor or any other multi-processor architecture may be used as the CPU 1001.

The components illustrated in FIG. 33 may be coupled to one another to execute any process described in any embodiment of the disclosure.

Upon operation, the processing unit 1000 may load programs stored in the storage unit 1005 to execute the loaded programs. The processing unit 1000 may read data from the storage unit 1005 together with the programs, and may write data in the storage unit 1005. The CPU 1001 may execute the programs loaded from the storage unit 1005. The memory 1002 may be a work area in which programs to be executed by the CPU 1001 and data to be used for operation of the CPU 1001 are held temporarily. The timer 1003 may measure time intervals to output a result of the measurement to the CPU 1001 in accordance with the execution of the programs. The GPU 1004 may process image data in accordance with the programs loaded from the storage unit 1005, and may output the processed image data to the CPU 1001.

The parallel I/O controller 1020 may be coupled to parallel I/O devices operable to perform communication with the processing unit 1000, and may control the communication performed between the processing unit 1000 and the parallel I/O devices. Examples of the parallel I/O devices may include the laser unit 3, the main pulsed laser unit 3M, the pre-pulsed laser unit 3P, the image sensors 83, 83M, and 83P, the first image sensor 83A, and the second image sensor 83B. The serial I/O controller 1030 may be coupled to serial I/O devices operable to perform communication with the processing unit 1000, and may control the communication performed between the processing unit 1000 and the serial I/O devices. Examples of the serial I/O devices may include the pressure adjuster 165. The A/D and D/A converter 1040 may be coupled to analog devices such as various kinds of sensors through respective analog ports. Examples of the sensors may include a temperature sensor, a pressure sensor, and a vacuum gauge sensor. The A/D and D/A converter 1040 may control communication performed between the processing unit 1000 and the analog devices, and may perform analog-to-digital conversion and digital-to-analog conversion of contents of the communication.

The user interface 1010 may provide an operator with display showing a progress of the execution of the programs executed by the processing unit 1000, such that the operator is able to instruct the processing unit 1000 to stop execution of the programs or to execute an interruption routine.

The exemplary hardware environment 100 may be applied to one or more of configurations of the EUV light generation controller 5, the EUV controller 51, the target controller 171, and the beam characteristic controller 84 according to any embodiment of the disclosure. A person skilled in the art will appreciate that such controllers may be executed in a distributed computing environment, namely, in an environment where tasks may be performed by processing units linked through any communication network. In any embodiment of the disclosure, the EUV light generation controller 5, the EUV controller 51, the target controller 171, and the beam characteristic controller 84 may be coupled to one another through a communication network such as Ethernet (Registered Trademark) or the Internet. In the distributed computing environment, the program module may be stored in each of local and remote memory storage devices.

13. Et Cetera

The foregoing description is intended to be merely illustrative rather than limiting. It should therefore be appreciated that variations may be made in example embodiments of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser unit, comprising:
   a master oscillator configured to output a laser light beam;
   a laser amplifier disposed in a light path of the laser light beam outputted from the master oscillator;
   an adjuster disposed in the light path of the laser light beam, and configured to adjust a beam cross-sectional shape of the laser light beam amplified by the laser amplifier to be a substantially circular shape, the beam cross-sectional shape being at a beam waist of the laser light beam or in the vicinity of the beam waist of the laser light beam, and being in a plane orthogonal to a light path axis;
   a detecting section disposed at a downstream of the adjuster in the light path of the laser light beam, and configured to detect the beam cross-sectional shape at the beam waist or in the vicinity of the beam waist; and
   a controller configured to control the adjuster, based on a result of the detection by the detecting section, wherein
   the adjuster includes a movable optical member and a rotary mechanism, the movable optical member being configured to vary a beam diameter of the laser light beam in one direction that is orthogonal to the light path axis, the rotary mechanism being configured to rotate the movable optical member around the light path axis of the laser light beam,
   the controller measures, based on the result of the detection by the detecting section, a first direction in which the beam diameter is maximized in the plane orthogonal to the light path axis and a second direction in which the beam diameter is minimized in the plane orthogonal to the light path axis, and
   the controller controls the rotary mechanism to allow the direction in which the beam diameter of the laser light beam is varied by the adjuster to be substantially the same as one of the first direction and the second direction.

2. The laser unit according to claim 1, wherein the laser amplifier is a slab amplifier that includes a pair of discharge electrodes disposed to oppose each other.

3. The laser unit according to claim 2, wherein
   an opposing direction of the discharge electrodes is substantially the same as a direction in which the beam diameter of the laser light beam is adjusted by the adjuster.

4. The laser unit according to claim 1, wherein
   the detecting section includes a detector and a light concentrator, the detector being configured to detect the beam cross-sectional shape, and the light concentrator being configured to concentrate the laser light beam onto the detector, and
   one or both of the detector and the light concentrator are disposed movably in a direction of the light path axis.

5. The laser unit according to claim 4, wherein the controller moves the light concentrator to allow the beam diameter in the second direction on the detector to be decreased.

6. The laser unit according to claim 1, wherein the controller moves the movable optical member to allow the beam diameter to be substantially the same in the first direction and the second direction.

7. The laser unit according to claim 1, wherein the controller moves the movable optical member to allow the beam diameter in the first direction to be minimized.

8. The laser unit according to claim 1, wherein
   the adjuster includes:
   a base;
   a main body disposed on the base;
   a rotary stage disposed on the base, and
   the rotary mechanism comprises the rotary stage.

9. The laser unit according to claim 8, wherein
   the main body contains:
   a toroidal lens;
   a first post;
   a second post;
   a first one-axis stage;
   a second one-axis stage;
   a first cylindrical lens disposed on the first one-axis stage with the first post in between;
   a second cylindrical lens disposed on the second one-axis stage with the second post in between, and
   the movable optical member comprises the first cylindrical lens and the second cylindrical lens.

10. An extreme ultraviolet light generating system comprising:
    a chamber in which a pulsed laser light beam is to be applied to a target to generate extreme ultraviolet light;
    a target feeder configured to supply the target into the chamber;
    a master oscillator configured to output a laser light beam serving as a seed of the pulsed laser light beam;
    a laser amplifier disposed in a light path of the laser light beam outputted from the master oscillator;
    a laser concentrating optical system configured to concentrate the laser light beam amplified by the laser amplifier into the chamber;
    an adjuster disposed in the light path of the laser light beam between the master oscillator and the laser concentrating optical system, and configured to adjust a beam cross-sectional shape of the laser light beam concentrated by the laser concentrating optical system to be a substantially circular shape, the beam cross-sectional shape being at a beam waist of the laser light beam or in the vicinity of the beam waist of the laser light beam, and being in a plane orthogonal to a light path axis;
    a detecting section disposed at a downstream of the adjuster in the light path of the laser light beam, and configured to detect the beam cross-sectional shape at the beam waist or in the vicinity of the beam waist; and
    a controller configured to control the adjuster, based on a result of the detection by the detecting section, wherein the adjuster includes a movable optical member and a rotary mechanism, the movable optical member being configured to vary a beam diameter of the laser light beam in one direction that is orthogonal to the light path axis, the rotary mechanism being configured to rotate the movable optical member around the light path axis of the laser light beam, the controller measures, based on the result of the detection by the detecting section, a first direction in which the beam diameter is maximized in the plane orthogonal to the light path axis and a second direction in which the beam diameter is minimized in the plane orthogonal to the light path axis, and the controller controls the rotary mechanism to allow the direction in which the beam diameter of the laser light beam is varied by the adjuster to be substantially the same as one of the first direction and the second direction.

11. The extreme ultraviolet light generating system according to claim 10, wherein the target feeder supplies the target to a location at the beam waist of the laser light beam or in the vicinity of the beam waist of the laser light beam.

12. The extreme ultraviolet light generating system according to claim 10,
wherein the detecting section is disposed in the light path of the laser light beam between the adjuster and the laser concentrating optical system.

13. The extreme ultraviolet light generating system according to claim 10, wherein
the detecting section includes a detector and a light concentrator, the detector being configured to detect the beam cross-sectional shape, and the light concentrator being configured to concentrate the laser light beam onto the detector, and
one or both of the detector and the light concentrator are disposed movably in a direction of the light path axis.

14. The extreme ultraviolet light generating system according to claim 13, wherein the controller moves the light concentrator to allow the beam diameter in the second direction on the detector to be decreased.

15. The extreme ultraviolet light generating system according to claim 10, wherein the controller moves the movable optical member to allow the beam diameter to be substantially the same in the first direction and the second direction.

16. The extreme ultraviolet light generating system according to claim 10, wherein the controller moves the movable optical member to allow the beam diameter in the first direction to be minimized.

17. The extreme ultraviolet light generating system according to claim 10, wherein the adjuster includes:
a base;
a main body disposed on the base;
a rotary stage disposed on the base, and
the rotary mechanism comprises the rotary stage.

18. The extreme ultraviolet light generating system according to claim 17, wherein
the main body contains:
a toroidal lens;
a first post;
a second post;
a first one-axis stage;
a second one-axis stage;
a first cylindrical lens disposed on the first one-axis stage with the first post in between;
a second cylindrical lens disposed on the second one-axis stage with the second post in between, and
the movable optical member comprises the first cylindrical lens and the second cylindrical lens.

* * * * *